(12) United States Patent
Van Nouhuys-Van Dalfsen et al.

(10) Patent No.: US 7,792,691 B2
(45) Date of Patent: Sep. 7, 2010

(54) METHOD, SYSTEM, AND COMPUTER PROGRAM PRODUCT FOR PROVIDING AND CREDITING A SOLUTION TO A BUSINESS ISSUE OF A CURRENT CLIENT

(75) Inventors: Anna Van Nouhuys-Van Dalfsen, Amsterdam (NL); Erwin Koster, Utrecht (NL); John Timmermans, Haarlem (NL); Stefan Smit, Driebergen (NL)

(73) Assignee: International Business Machines Corporation, Armonk, NY (US)

( * ) Notice: Subject to any disclaimer, the term of this patent is extended or adjusted under 35 U.S.C. 154(b) by 1433 days.

(21) Appl. No.: 10/290,232

(22) Filed: Nov. 7, 2002

(65) Prior Publication Data
US 2003/0145006 A1 Jul. 31, 2003

(30) Foreign Application Priority Data
Jan. 31, 2002 (EP) .................................. 02368014

(51) Int. Cl.
G06Q 10/00 (2006.01)
(52) U.S. Cl. ................................ 705/7; 705/10; 705/11
(58) Field of Classification Search ..................... 705/7, 705/10
See application file for complete search history.

(56) References Cited

U.S. PATENT DOCUMENTS

| | | | | |
|---|---|---|---|---|
| 6,647,374 | B2* | 11/2003 | Kansal | 705/37 |
| 2002/0082816 | A1* | 6/2002 | Nguyen et al. | 703/13 |
| 2002/0095325 | A1* | 7/2002 | Chiles | 705/9 |
| 2002/0128934 | A1* | 9/2002 | Shaer | 705/27 |
| 2003/0229529 | A1* | 12/2003 | Mui et al. | 705/8 |

OTHER PUBLICATIONS

Braksick, Assessing Organizational Capabilities and Engagement—An Overview of CLG's Approach, Jan. 7, 2001.*
Murtagh, Navigating Copyright in Modern Business: How often is copyright infringed in your organisation? In an increasingly information-driven workplace, management should work out a clear list of procedures for making copyright compliance a part of everyday working life, New Zealand Management, Oct. 2000, p. 42 (pdf version, p. 1-3).*
Saba Learning Exchange, Saba.com, retrieved from web.archive.org, May 10, 2000, 1 pg.*

* cited by examiner

*Primary Examiner*—Beth V. Boswell
*Assistant Examiner*—Justin M Pats
(74) *Attorney, Agent, or Firm*—William H. Steinberg, Esq.; Kevin P. Radigan; Heslin Rothenberg Farley & Mesiti P.C.

(57) ABSTRACT

An integrated method and system for supporting the activity of consultants in organization and management consulting and services projects.

The system comprises a server to which are connected consultant and client workstations. Through his workstation and with the method of the invention, the consultant uses the system parameters to assess the management and organization of a client situation and obtain from the system the results to be realized. From his workstation the consultant can also select a solution already used and stored in the system and adapt, if necessary, the solution to the results to be realized.

The system automatically stores solutions positively evaluated. The solution information will be reused, as part of the invention by the consultants, the managers and solution owners in the consulting and service provider company.

17 Claims, 19 Drawing Sheets

SOLUTION(I)

| Field | Description | Format |
|---|---|---|
| Name | Name of the solution | Alphanumeric |
| Solution Code | Unique key that identifies a solution | Alphanumeric/ numeric |
| Description | Describes the purpose of the solution, according to a predefined template | Alphanumeric |
| Owner | Indicate the owner of a solution* | Alphanumeric/ numeric |
| Practitioner code | Indicates the practitioner participates the creation & delivery of the solution* | Alphanumeric/ numeric |
| Engagement | Indicates the engagement in which the solution will be delivered.* | Numeric |
| Client | Indicates the client to whom the results of the engagement are delivered.* | Numeric |
| Date | Date from which the solution can be accessed by others (= date at which the solution has entered the Workproduct & Solution Database) | Date |

FIG. 18A

SOLUTION(II)

| Field | Description | Format |
|---|---|---|
| Ability description | Indicates which ability the solution addresses.* | Numeric |
| Ability Gap | Indicates which ability gap the solution breaches.* | Numeric |
| Complexity | Indicates the complexity of the solution | Numeric |
| Engagement Effect | Indicates the desired Engagement Effect of the solution. | Alphanumeric |
| Work product* | Indicates the work product delivered.* | Numeric |
| Services | Indicates the service delivered in the solution* | Numeric |
| Solution time | Indicates the time span of the solution delivery | Numeric |
| Usage incidence | Indicates the number of times the solution was used since the date in the 'date' field.* | Numeric |
| Client Effect Evaluation | Describes the solution evaluation of the client | Alphanumeric |

FIG. 18B

WORKPRODUCT

| Field | Description | Format |
|---|---|---|
| Name | Name of the work products | Alphanumeric |
| Work product Code | Unique key that identifies a work product | Alphanumeric/numeric |
| Description | Describes the purpose of the work product, according to a predefined template | Alphanumeric |
| Owner | Indicates the practitioner code of the owner of the workproduct | Alphanumeric/numeric |
| Author | Indicates the practitioner code of the author of the workproduct | Alphanumeric/numeric |
| Date | Date from which the work product can be accessed by others = date at which the work product has entered the candi database | Date |
| Ability description | Indicates which ability the work product addresses* | Numeric |
| Ability Gap | Indicates which ability gap the work product breaches* | Numeric |
| Usage incidence | Indicates the number of times the work product was used since the date in the 'date' field | Numeric |
| Usage level | Indicates the level of use per incidence: | Numeric {codes for 'consulted, reused, adapted'} |
| Solution link | Indicates in which solution the work product was used* | Alphanumeric {Solution name}, {Solution name} |
| Practitioner Evaluation | Indicates the practitioner evaluation of the work product per usage incidence* | Alphanumeric |
| Client Satisfaction Evaluation | Indicates the work product evaluation of the work product per usage incidence | Alphanumeric |

FIG. 19

SERVICE

| Field | Description | Format |
|---|---|---|
| Name | Name of the service | Alphanumeric |
| Service Code | Unique key that identifies a service | Alphanumeric/numeric |
| Description | Describes the purpose of the service, according to a predefined template | Alphanumeric |
| Service Level | Indicates what level of service is offered | Numeric |
| Owner | Indicates the owner of a service.* | Alphanumeric/numeric |
| Practitioner code | Indicates the practitioners who can provide the service* | Alphanumeric/numeric |
| Date | Date from which the service can be accessed by others = date at which the service has entered the candidate database | Date |
| Ability description | Indicates which ability gap the service addresses* | Numeric |
| Ability Gap | Indicates which ability gap the service breaches* | Numeric |
| Work products | Indicates what work product will be used as part of the service (if appropriate)* | Numeric |
| Usage incidence | Indicates the number of times the service has been included in a solution | Numeric |
| Usage level | Indicates the level of reuse per incidence: | Numeric {codes for 'consulted, reused, adapted'} |
| Solution link | Indicates in which solution the service has been included* | Alphanumeric {Solution name}, {Solution name} |
| Practitioner Evaluation | Indicates the practitioner evaluation of the service per usage incidence* | Alphanumeric |
| Client Satisfaction Evaluation | Indicates the service evaluation of the service* | Alphanumeric |

FIG. 20

PRACTITIONER

| Field | Description | Format |
|---|---|---|
| Name | Name of the practitioner | Alphanumeric |
| Practitioner Code | Unique key that identifies a practitioner | Alphanumeric/numeric |
| Expertise | Indicates the areas of expertise of the practitioner | Alphanumeric |
| Training Status | Indicates whether the practitioner has participated in a training has been received | Numeric |
| Certification Status | Indicates certification status | Numeric |
| Credit Bank Account | Indicates the number of credits awarded to the practitioner | Numeric |
| Practitioner Evaluation History | Indicates the practitioner's evaluation by other practitioners per solution | Alphanumeric |
| Client Evaluation History | Indicates the evaluations of the practitioner by clients per solution | Alphanumeric |
| Manager | Is the practitioner a manager? | Yes or NO |

FIG. 21

ENGAGEMENT

| Field | Description | Format |
|---|---|---|
| Name | Name of the Engagement (composite field: solution name + client name) | Alphanumeric |
| Engagement Code | Unique key that identifies an engagement | Alphanumeric/numeric |
| Practitioner Code | Indicates the practitioner that participates in the engagement.* | Alphanumeric/numeric |
| Role | Indicates the role of the practitioner in the engagement | Alphanumeric/numeric |
| Client Code | Indicates the client to whom the results of the engagement are delivered.* | Alphanumeric/numeric |
| Solution Code | Indicates the solution that will be delivered* | Alphanumeric/numeric |
| Start date | Indicates the start date of the engagement | Date |
| End date (EST) | Indicates the estimated end date of the engagement | Date |
| End date | Indicates the end date of the engagement | Date |

FIG. 22

CLIENT

| Field | Description | Format |
|---|---|---|
| Name | Name of the client | Alphanumeric |
| Client Code | Unique key that identifies a client | Alphanumeric/numeric |
| Business Goal | Indicates the business goal of the client* | Alphanumeric |
| Client Issue | Indicates the issues of the client* | Alphanumeric |
| Engagement Code | Indicates the engagement the client is involved in* | Alphanumeric/numeric |
| Maturity Ability (DES) | Desired maturity Ability* | Numeric |
| Maturity Ability (Actual) | Actual maturity Ability* | Numeric |

METHOD, SYSTEM, AND COMPUTER PROGRAM PRODUCT FOR PROVIDING AND CREDITING A SOLUTION TO A BUSINESS ISSUE OF A CURRENT CLIENT

FIELD OF THE INVENTION

The present invention generally relates to organization and management consulting and services projects; more particularly, the present invention is directed to an automated, computerized method and an integrated system supporting organization and management consulting and services projects.

BACKGROUND OF THE INVENTION

Most of the consulting and services providers have developed internal "knowledge management systems" to store the solutions provided for their clients. User interfaces are used to allow the consultants and/or other employees of these companies that deliver specific services, to access the knowledge management system for the reuse of such solutions. A solution specifically developed for one client can be reused 'as is', or it can be adapted to the specific needs of another client. The reuse of "know how" allows to save time and money.

One problem in providing consultancy and services solutions is that consultants are reluctant to reuse existing solutions stored in current knowledge management systems. The reuse and adaptation does not seem to be so easy, and the consultants are not really confident in the quality of the solutions they see in the databases. The consultants consider the knowledge management process as independent from their consulting and service provider activities.

One other problem in providing consulting and services projects, is the turn around time to assess the client's situation and to develop a proposal for a solution. Consulting and services projects generally start with an "assessment phase" where a consultant assesses the business situation and the needs of his client in management and organization. Once the assessment phase is completed, the consultant is able to prepare a proposal for a solution which will bind the client and the provider. To be competitive, the consultant needs to make a proposal as fast as possible. Therefore, turn around time of the assessment phase and time to build the proposal is of strategic importance for the consulting and service providers.

SUMMARY OF THE INVENTION

The first object of the invention is to provide a consultant working for a consulting and service provider with a system and a method, integrated with all the phases of a consulting and services project, that store used solutions, and user interfaces to allow access to them.

A second object is to have as part of the system and the method a process of evaluation of the quality of the solutions stored during the phases of the project.

A third object is to provide a system and a method that enables the consultant to reduce the process time of the assessment of the client's management and organization capability and the client's business situation, and of the time needed to build a proposal for a solution.

These objects are reached with the use of a computerized system supporting consultant activity in a company delivering to clients, services in organization and management projects, said system comprising:

at least one server comprising:
 means to store, retrieve and display information about solutions which have been already used by the consultants during other projects;
 means to store, retrieve and display system parameters providing information qualifying a client situation in management and organization, said means associating to a client situation, specific results to be realized to improve said client situation;
 a subsystem for defining personal storages, defining shared accesses between them and performing document processing in them;
 a subsystem to communicate with workstations connected through a network to said at least one server;

at least one first workstation connected to the at least one server used by a consultant to activate in the at least one server:
 the means to store, retrieve and display system parameters used by the consultant to obtain information qualifying the situation of his client and retrieve the specific results;
 the means to store, retrieve and display solution information, said consultant selecting one solution according to the specific results to be realized;
 the subsystem for defining a personal storage used by the consultant to process the retrieved specific results and to process the retrieved selected solution in the personal storage.

These objects are also reached with the use of a method to support consultant activity in a company delivering to clients, services in organization and management projects, said method comprising the steps of:
 reading system parameters through a user interface from at least one first workstation connected to at least one server;
 entering information about the organization and management situation of a client from said first workstation;
 processing from said first workstation system parameters to automatically obtain information qualifying the client situation and results to be realized to improve said client situation;
 defining from said first workstation a first personal storage to store the information qualifying the client situation and results to be realized and modifying said information;
 reading information on solutions stored in said at least one server which have been already used by the consultants during other projects;
 selecting one solution among all the solutions stored said selection being done according to the results to be realized, storing it in said first personal storage and modifying said solution information.

By providing a set of computerized tools that allow efficient reuse of existing "workproducts" (standard products or existing products already developed specifically for one client), "services" (a combination of one or more workproducts that address generic client problems) and "solutions" (one or more workproducts and/or services, specifically combined to address a specific client's problem) to build a proposal for the client, the present invention allows to reduce the process times. This enhanced efficiency in solution development supports the achievement of a competitive advantage by a consulting and service provider. The efficiency is further enhanced by the use of intelligent reference parameters by the search engine of the present invention. These parameters are created and updated by a group of expert consultants ("core team"). In contrast with most current knowledge management systems, this ensures a definite end to a search of the intellectual capital (i.e workproducts, services, solutions) stored by the users of the system and method of the present invention.

Intellectual capital that is stored and managed effectively, and enriched by client's feedback as well as feedback of professionals, constitute the highest quality assets for any consulting and services provider. To ensure this quality, only solutions that have proven themselves during a project are stored in the system. Furthermore the invention ensures that the owners of these solutions remain available for questions and support.

Another advantage is that no time is lost between a proven successful execution of a solution in one project and the availability for reuse of this solution in another project. This is because availability of a solution is controlled by an automated system process. The criteria and necessary controls for this automated process have taken place during the execution of the project.

According to the solution of the present invention, the data bases that contain the intellectual capital are self-learning. This ensures that the more the intellectual capital is used and enriched with evaluations, the more the consulting and services project support will be automated and, hence, process times reduced.

The system and method of the present invention can also be used by the consulting and service provider to automate the professional certification process. 'Certification' is a process for professional qualification, used by most consulting and service providing companies of the ICT industry. The system registers the 'credits' a professional receives for his performance (for example, after a positive evaluation by the client, or when a workproduct developed by him is reused). The amount of credits a professional has earned determines his qualification level: trainee, certified, or expert. The automatic certification process can be reviewed regularly by specific expert professionals and the management community of the consulting and service provider. This automated certification process results in reduced time and costs involved with a certification process, and supports certification based on specific and measurable results.

Finally, the consulting and services provider management community takes advantage of the method and system of the present invention by using it for a close follow up of the quality of the activities of the professionals.

BRIEF DESCRIPTION OF THE DRAWINGS

FIG. 18A and FIG. 18B describe the content of the SOLUTION data element used by the method and the system according to the preferred embodiment;

FIG. 19 is the description of the WORKPRODUCT data element used by the method and the system according to the preferred embodiment;

FIG. 20 is the description of the SERVICE data element used by the method and the system according to the preferred embodiment;

FIG. 21 is the description of the PRACTITIONER data element used by the method and the system according to the preferred embodiment;

FIG. 22 is the description of the ENGAGEMENT data element used by the method and the system according to the preferred embodiment;

FIG. 23 is the description of the CLIENT data element used by the method and the system according to the preferred embodiment;

DETAILED DESCRIPTION OF THE PREFERRED EMBODIMENT

Figure 1:
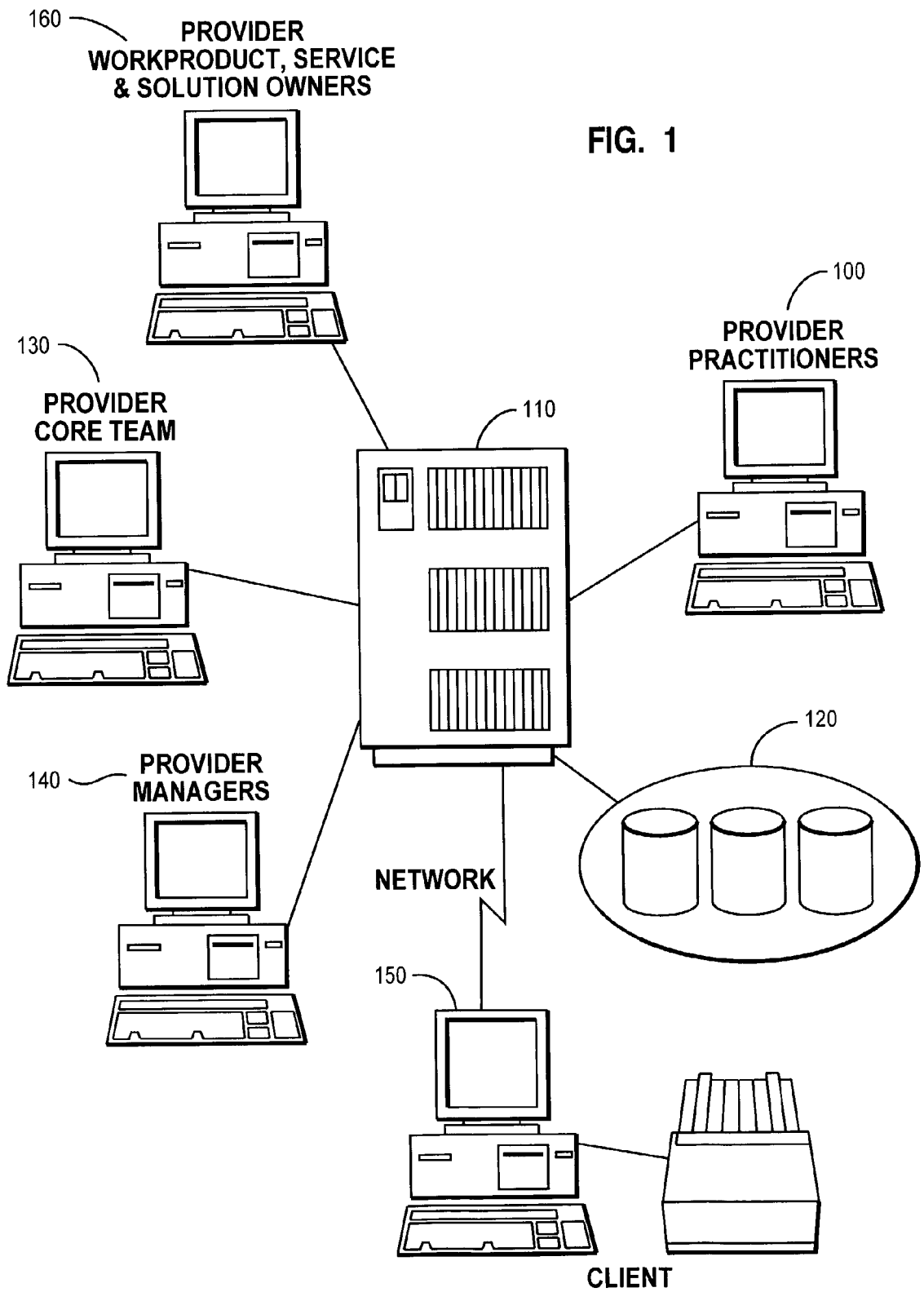
FIG. 1 is an overview of the system according to the present invention, and the user groups that interact with the system through user interfaces.

FIG. 1 is a general overview of the integrated computerized Consulting and Services automation System (the CS System) and the various user groups using it according to the preferred embodiment. The CS system is a set of programs executed on a server (110) or a set of servers, and activated by the various user groups. Each user group interacts with the system through a group-specific user interface (a set of computer instructions dedicated to handle the interaction between human users and the system components). The user interface can be accessed from a workstation that has a network connection with the CS System's server. In addition to the programs that are executed by the initiatives of the user, the CS system automatically executes programs for managing the content of the data bases (120). The databases contain the intellectual capital of the consulting and service provider. This intellectual capital mainly consists of (descriptions of) Workproducts, Services, and Solutions.

The primary user group of the CS System (100) is formed of the "practitioners". Practitioners are professionals (consultants or other) who are employed by a consulting and services provider. They are the actors in an "engagement" between a client and the provider. An engagement is a set of activities performed by practitioner and a client for a definite period of time and according to agreements made by the client and the practitioner. An engagement may include the delivery of a solution. An engagement starts with the first visit to the client, and is completed when end-of-engagement feedback is provided by the client and the practitioners, according to the preferred embodiment. A practitioner can have of one of the following qualification levels: trainee, certified, or expert. The practitioners conduct interviews with the client through which they collect information about the client's situation. The collected information will be entered into the CS System through the practitioner's user interface on a workstation that is connected with the CS System's server and databases. The information entering will be done through a step-by-step approach, evoked by the execution of the system's programs. Automated information processing performed by the computer programs of the CS system components will further assist the practitioner to prepare a proposal for his client and to monitor its realization and its quality.

The second user group of the CS System is formed of Core Team members (130). The Core Team members are the system managers. They are expert consultant professionals who may act as practitioners in an engagement and/or who may perform specific core team tasks. When acting as a practitioner the practitioner user interface of the CS System is used as described above. When acting as a core team member, they use the CS system and the method of the preferred embodiment to set up and maintain the parameters of the system. The parameters are provided to the practitioners during the engagement with their clients. The core team members maintain the CS system by using their high level of professional experience as expert consultant professionals. To set up and maintain the system parameters, the core team members interact with the CS System through a specific core team member user interface.

The third user group of the CS System is formed by the clients of the consulting and service provider (150). The client interacts with the CS system through a specific client user interface. The client interacts with the CS System to contribute to the assessment during the assessment phase of the engagement and to contribute to the evaluation during the evaluation phase of the engagement.

As it will be described later in the document, during the assessment phase of the engagement, when the practitioner has performed the assessment of the client situation, the client has access to the results. During the evaluation phase, the client has two possible interaction moments: during the client satisfaction evaluation of individual workproducts, services and practitioners, and during the end of engagement Effect Evaluation when the entire solution has been delivered. During the client satisfaction evaluation, specific workproducts and services that practitioners have developed and/or delivered as part of the solution ("workproduct/services evaluation") are evaluated as well as the way the engagement was managed and executed by the practitioners ("practitioner evaluation"). This is followed by an evaluation of the degree to which the agreed effect was obtained ("Effect Evaluation").

The fourth user group that interacts with the CS System are managers of the consulting and service provider (140). The managers interact with the CS System through a specific manager user interface and use the CS system to retrieve information about the performance of the professionals they manage.

The fifth user group that interacts with the CS System are workproduct, service and solution owners (160). Workproduct, service and solution owners ("Owners") are professionals and/or practitioners who have the responsibility to maintain the quality and relevance of workproducts, services and solutions. They remain available to support practitioners who reuse their products. The owners are likely to be the professionals who have developed and used the workproduct, service, or solution as a practitioner during an engagement. During this engagement the workproducts, services and/or solutions were thus entered in the CS system using the method of the preferred embodiment. The Owners interact with the CS System through a specific Owner's user interface that allows them to receive feedback about the quality of their workproducts, services and/or solutions. The Owners can also be practitioners and use the system and method of the preferred embodiment as a practitioner (100).

Figure 2:
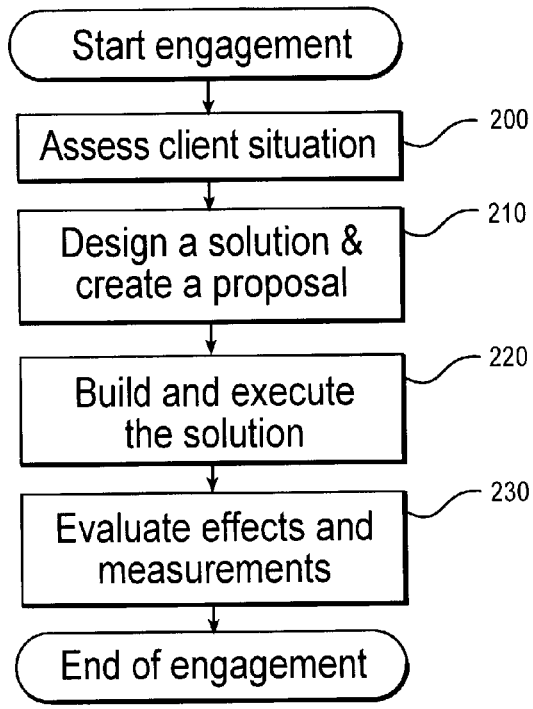
FIG. 2 is the flowchart of the method used by the "practitioners" during a consulting and service "engagement".

FIG. 2 is a flowchart describing the successive phases of an "engagement" that the practitioners user group (100) conduct with the client.

An engagement starts with an interview with the prospect client. The practitioner who is the "engagement leader" manages the contacts with the client.

The first phase of the engagement is the "assessment phase" (200). During the contacts that the practitioner has with the client, information about the client's business situation and organization & management capability are collected. After the interviews, the information is entered into the CS System using the practitioners user interface. The computer programs of the CS System, provide reference parameters to the practitioner to assess the customer situation. These reference parameters have been validated and entered in the CS System by "Core Team" members.

The second phase of the engagement is the Design & Propose phase (210), which is executed by the practitioner after the client's situation has been assessed. The computer programs of the CS System assist the practitioner to design a solution for a specific client, to make a proposal for a solution, and to define the engagement requirements—once they have been agreed with the client. In the Design & Propose phase, the practitioner stores information concerning his client case in a local personal storage. This means that this information is not yet shared with other practitioners.

The third phase (220) of the engagement process is the Build and Execute phase. In this phase the proposed solution is actually built by the practitioner involved. To build a solution, the practitioners are supported by the CS System, that enables them to reuse entire existing solutions, workproducts or services. Reuse can be 'as-is' (no adaptations), or adapted to accommodate a specific client's needs. After the solution has been built, it is executed by the practitioner. In this phase, solution information remains in the local personal storage of the practitioner, and can thus not be accessed by others.

The fourth and last phase (230) of the engagement is the Measure and Evaluate phase. In this phase, the effects of the solution, service and the workproducts that have been used with the client are measured and evaluated. This phase allows the practitioner and the client to enter feedback into the CS System. Measurement takes place at several levels. First, the client and the practitioner may evaluate individual workproducts and services. Secondly, client and practitioner may evaluate the contribution of specific practitioners participating in the engagement. Finally, the client may evaluate the effects of the solution in the client's situation. Consequently, the CS System will store all feedback information. When evaluated positively by the client, the solution is made available for access by other practitioners.

FIG. 3 to FIG. 6 illustrate the successive steps of the engagement flow as described in general in FIG. 2. Before these steps are outlined in detail, some general characteristics will be addressed first.

When entering the user practitioner user interface, the practitioner can display a menu which allows him to activate various functions. The functions that relate to the tasks and activities the practitioner needs to perform, for example in the context of an engagement. The functions are activated either sequentially or independently. For example, for the assessment phase as illustrated with the flowchart of FIG. 3, the practitioner's user interface allows to execute any of the steps illustrated in FIG. 3 independently, but it always respects the sequence in which they were taken. This implies that, at the end of each step, the CS System saves the context of the execution of each step.

Figure 3:
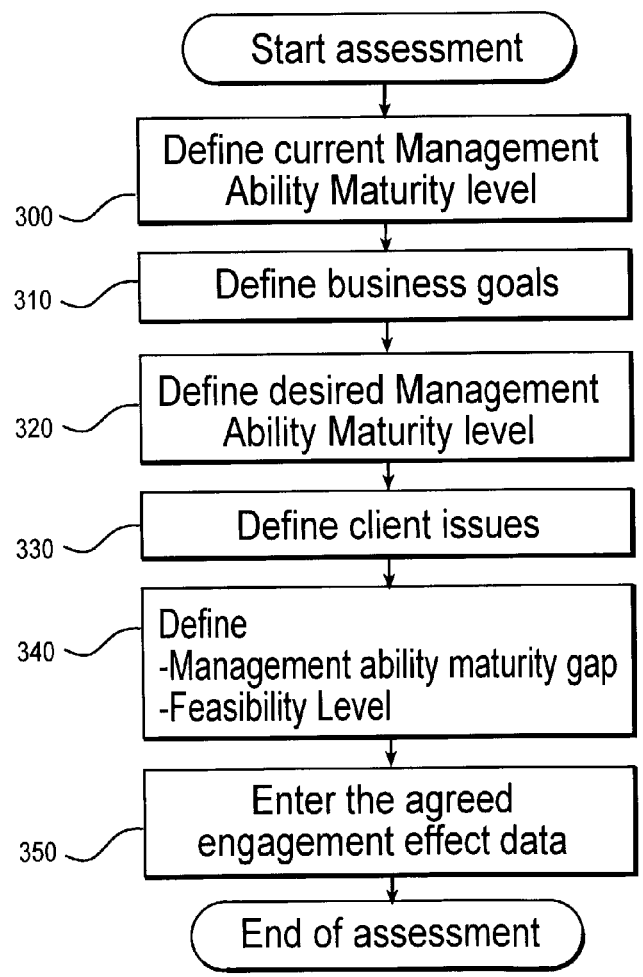
FIG. 3 is the flowchart of the method used by the practitioners to assess the client situation.

FIG. 3 is the flow chart of the method used by the practitioners to perform the first part of the engagement with the client, which is the assessment of the client business situation, and management and organization capability. In the preferred embodiment, the assessment method is implemented as a computer program or a set of computer programs, activated by the practitioners on a workstation through the practitioner's user interface of the CS System. For clarity reasons, only the user interface of the method is described with the flowcharts, most of the other steps performed internally and automatically by the system are described later in the document, in reference to FIG. 12 to FIG. 17.

Before describing the sub steps of the assessment method, one should note that during the execution of the assessment phase, the practitioner is assisted by the CS System through the user interface. The CS System provides the practitioner with reference parameters such as the client issues. These parameters have been previously validated and entered in the system as outlined earlier in this document.

The reference parameters are flexible and can be updated by the practitioner. For each step of the assessment method, the practitioner can either use the reference parameters suggested by the CS System, or the practitioner can discard the suggested parameters and create new parameters that, are better adapted to the client's business situation. By entering the new situation into the CS System with the same approach than the computer, the practitioner 'teaches' the CS System by enriching and elaborating the information that resides in the CS System's reference tables. The core team can validate the new information.

The first step of the client situation assessment (300) is to perform a Management Ability Maturity assessment. This function is selected from the menu of the practitioner user interface of the CS System, and displayed on a workstation. Once this function is selected, a list of "true" and "false" statements ("ability statements") is displayed on the screen. These ability statements correspond with different management abilities that may or may not be present to a certain level in the client's organization. The management abilities are: 1) Customer Value & Relationship Management, 2) Leadership, 3) Culture & Image, 4) Capability design, 5) Organisation Design, 6) Governance, 7) Human Resource Development, 8) Human Capital Management, 9) Human Resource Management, and 10) Performance & Progress Measurement. Together, the management abilities constitute the management capability of an organization. The score resulting from the client's answers to the ability statements, indicates the level of maturity of each management ability in the client's organization. The levels of ability maturity are: "1. Unfocused, 2. Aware, 3. Capable, 4. Mature and 5. World class". Based on client interviews, the practitioner finds proof for the ability statements to be "true" or "false". The system invites the practitioner to enter the results from the client interviews into the CS System in a step-by-step-question-and-answer-fashion. The CS System then calculates the current management ability maturity levels of the client's management capability. The results of this calculation are displayed by the practitioner user interface of the CS System.

The second step of the situation assessment phase of the engagement is to define the business goals of the client (310). The function to define business goals is selected from the menu of the practitioner user interface of the CS System. Once this function is selected, a list of known business goals is displayed on the screen. If the practitioner finds that one of the known business goals in the list sufficiently matches the client's goal, as expressed during the interviews, the practitioner selects the matching goal by clicking on it. If the practitioner finds that none of the known business goals in the list sufficiently describes the client's situation, the practitioner enters a new business goal description into the CS System. This is done by typing text into a text field in the practitioner's user interface. Because business goals are associated with specific management abilities and maturity levels (see the description of 320 below), the CS System will request the practitioner to enter a desired management ability maturity level into the system, in the case that a new goal has been defined.

The third step of the situation assessment phase of the engagement is to define the desired management ability maturity level for the client (320). As mentioned earlier, known business goals correspond with predefined levels of maturity of certain abilities. This means that, in order to reach a specific known business goal, the client needs to have achieved a specific level of maturity of a specific management ability.

The function to define the desired management ability level is selected from the menu of the practitioner user interface of the CS System. Once this function is selected, the CS system retrieves the current management ability maturity level and the current business goal, established for the particular client, and displays a suggested desired management ability maturity level. The desired level is computed by the CS System, and the practitioner can approve it or override it. When the practitioner overrides the suggested desired level, he is prompted by the system to enter an alternative.

The fourth step of the client situation assessment (330) is to define the client issues and global issues that have to be overcome to reach the business goal. This function is selected from the menu of the practitioner user interface of the CS System and displayed on a workstation. Once this function is selected, the computer retrieves the parameters (current management ability maturity level, current business goal, desired management ability maturity level) for the client, and the CS System practitioner's user interface displays the list of related known client issues on a workstation. The practitioner can either select one known client issue from the list or enter one new client issue. Then, if the practitioner has selected one known client issue from the list, the computer displays the global issue under which the client issue resorts. If the practitioner has entered a new issue, the computer displays the list of all possible global issues and requires the practitioner to select a global issue or suggest a new global issue. This suggested new global issue is an input for the core team user group (130), which has to approve or disapprove it.

The fifth step of the client situation assessment (340) is to perform a gap analysis between the current maturity of the client and the maturity that is needed to reach business goals. This function is selected from the menu of the practitioner user interface of the CS System and displayed on a workstation. Once the function is selected, the CS System retrieves the parameters (business goals, client issues etc . . . ) that correspond to an engagement and computes two pieces of information. The first piece of information that is computed provided by the CS System, is the "management ability maturity gap". This is the difference between the current management ability maturity level of the client's organization and the desired maturity level associated with the client's business goals. The second piece of information computed by the CS system is the level of feasibility of closing the gap within 6 months time. This automated process is explained in more detail in FIG. 14. The feasibility is expressed by one of the following four levels: 1) Easy to accomplish, 2). Feasible to accomplish, 3) Difficult to accomplish, or 4). Unattainable ideal. These two pieces of information are used for the gap analysis.

The sixth and last step of the situation assessment phase of the engagement, is to enter an Engagement Effect that has been agreed with the client (350). An "effect" is a result intended to be realized after the solution has been implemented for an x period of time. With the system and method of the preferred embodiment, during the engagement phase, uses not only a description of the solution but also a description of some specific effects to be achieved with the execution of the solution. The Engagement Effect function is selected from the menu of the practitioner user interface of the CS System, and displayed on a workstation. Once this function is selected, the practitioner is promoted by the CS System to enter the "Engagement Effect Data". This data consists of two main parts: The first part is a description of the maturity level that the client wants to obtain when the engagement is completed. This is the agreed Engagement Effect. The second part consists of the "engagement requirements". The engagement requirements are all specific requirements the client has concerning the engagement. These requirement can be the need for speed, the need for client personnel to be involved, budget constraints, etc . . .

It is should be noted that the agreed Engagement Effect data is entered in the CS System during the assessment phase of the engagement as described above. In the last phase of the engagement, feedback about the actual effects of the engagement will be requested by the computer to be entered. This will be done by the programs executed in the last phase of the engagement as described later in the document in reference with FIG. 6. In summary, the computer provides a process to measure the quality of the engagement.

Figure 4:
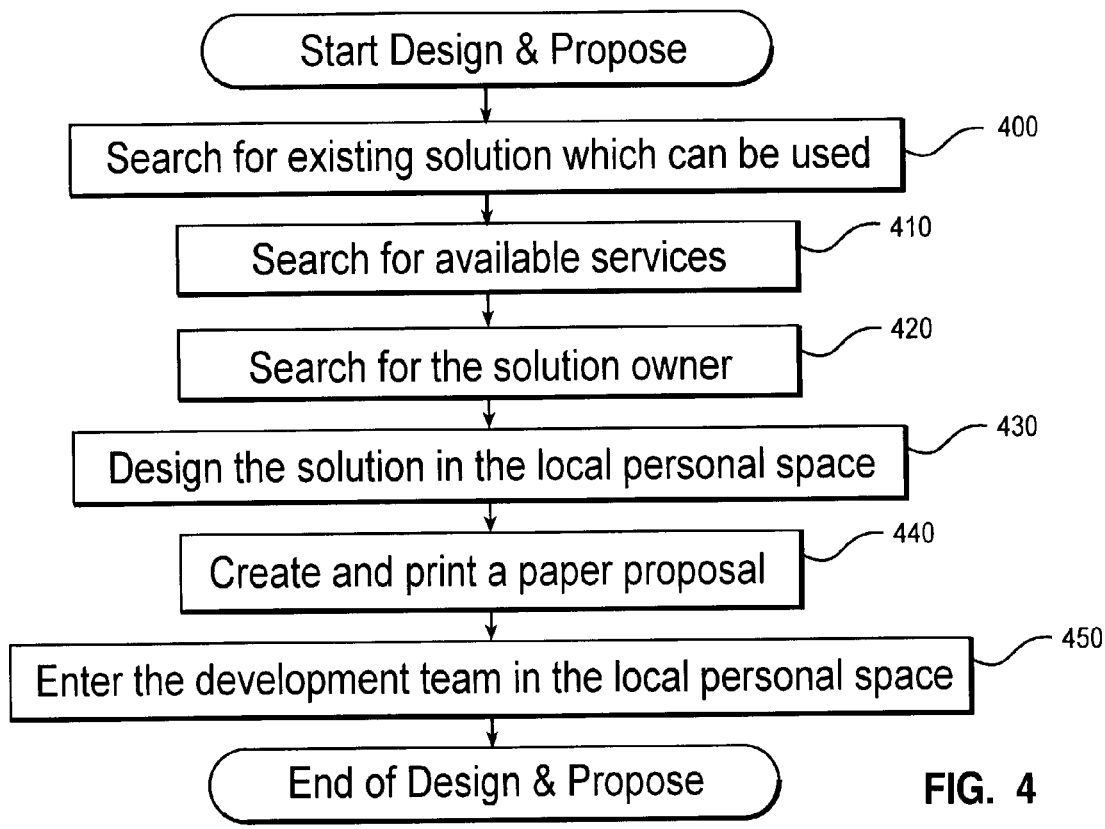
FIG. 4 is the flowchart of the method used by the practitioners to design and make a proposal for a solution to the client.

FIG. 4 is the flow chart of the method used by the practitioners to design a solution and to make a proposal for the client. This phase is the second phase of an engagement, and it is performed once the assessment of the client situation has been completed, and the Engagement Effect has been agreed. In the preferred embodiment, the Design & Propose method is implemented as a computer program or a set of computer programs, activated by the practitioners on their workstation. As with the other phases of the engagement method, the computer proposes to execute a succession of steps These steps are activated either sequentially or independently, but always respect the sequence. At the end of each step, the computer memorizes the data environment of a client for the steps already executed.

The first step of the Design and Propose phase is to search in the "Solution, workproducts & services" database of the CS System for an existing solution that can be used to obtain the agreed Engagement Effect (400). A solution consists of a solution description and the descriptions of workproducts and/or services used in the solution. This function is selected from the menu of the practitioner user interface of the CS System, and displayed on a workstation.

Once this function is selected, a search window is displayed on the screen of practitioner workstation. The search window allows the practitioner to enter search criteria. The search criteria are: 1) Engagement Effect 2) known Client Issue, and 3) desired Ability Maturity Level. In addition to entering search criteria the practitioner can also choose to select a solution from a list with solution descriptions.

The second step of the Design & Propose phase of the engagement, is to search for available services (410). This function is selected from the menu of the practitioner user interface of the CS System, and displayed on a workstation. Once this function is selected, a search window is displayed on the screen of practitioner workstation. The search window allows the practitioner to enter search criteria. The search criteria are: 1) service description in terms of the management ability that it addresses, or 2) desired ability maturity level. In addition to entering search criteria the practitioner can also choose to select a service from a list with service descriptions. Note that the creation of services is the prerogative of the 'core team' members.

In the third step of the Design & Propose method (420) the practitioner retrieves and displays the contact information of the owner of a solution, workproduct or service he has selected during the search of the previous step (400) in the Solutions, Workproducts & Services data base. With this information the practitioner will be able to contact the owner to get more information about the solution, workproduct or service and compare the searched solution and available services with the client requirements. This information helps the practitioner to finalize his choice.

The fourth step of the Design & Propose method (430) is to design a solution in a local personal space of a practitioner. To support this step the CS System is integrated with a groupware computer tool such as Lotus Notes. This is a product of IBM, that enables collaborative work by providing shared work spaces for a group of users, in addition to having separate local personal spaces for each group member. No practitioner can access the local space of another practitioner except if specific accesses are given by the owner of a work space. This prevents simultaneous access or use by multiple practitioners at the same time during the phase of Design & Propose.

The practitioner can either reuse an existing solution or design a new solution. When reusing an existing solution he enters the description of a solution in his local work space. This description is taken from the search previously done in the "Solutions, Workproducts & Services" data base (400). The effect descriptions, solution description and service description are copied from the system into in the local work space. The practitioner can choose to adapt this solution. He is then required by the computer to enter the description of the adapted solution in the local space. When the practitioner designs a new solution, he is prompted by the CS System to enter the description of the new solution in the local work space and add all relevant assessment data. In both situations, designing a new solution or reusing an existing one, the practitioner is prompted to enter generic terms to identify the client solution. These terms will be used in the event that the solution is copied from the local space of the practitioner to the shared space of the system for the purpose of reuse it. This will be explained later in the document in reference with FIG. 6 describing the solution lifecycle management.

The fifth step of the Design & Propose method (440) is to create a printed paper proposal. This function is selected from the menu of the practitioner's user interface of the CS System displayed on a workstation.

Once this function is selected, the CS System practitioner user interface offers connectivity with the usual editing tools of the groupware and the Customer Relationship Management (CRM) tools of the provider which are usual available tools used in the IT professional activity. Once these tools are activated, the practitioner is able to copy the designed solution from the local work space into these tools, in order to create the proposal. In addition to the solution, all relevant information that was stored into the CS System during the first phases of the engagement can be copied into the editing and CRM tools as well. This information can be: client information, agreed Engagement Effects, and engagement requirements.

If the practitioner has chosen to propose an existing solution to the client, the client feedback that was provided during measurement and evaluation of that engagement (see FIG. 6 for details) can be added for reference purpose.

The sixth and last step of the Design & Propose method is to enter the participants in the engagement. The engagement team definition function is selected from the menu of the practitioner user interface and displayed on a workstation. Once this function is selected, the practitioner is prompted by the CS System to confirm the approval of the client with the proposed solution. If the practitioner confirms that the client agrees to the proposal, the CS System prompts the practitioner to enter the names and roles of practitioners who are involved in building and execution of the engagement. This information is stored in the personal local space of the practitioner. If the client did not agree with the proposed solution, all proposal data is stored locally in the personal workspace of a practitioner.

Figure 5:
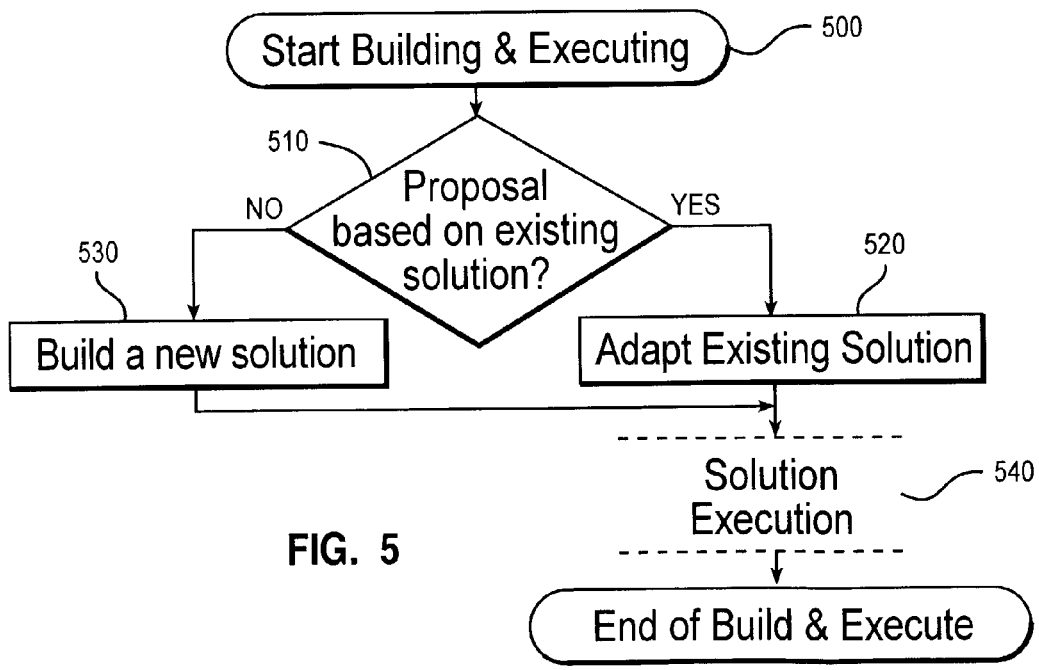
FIG. 5 is the flowchart of the method used by the practitioners to build and execute the proposed solution.

FIG. 5 is the flow chart of the method used by the practitioners to Build and Execute the solution proposed. This phase is the fourth phase of the engagement with the client, and it is performed once design & propose phase is completed In the preferred embodiment, the build & execute phase of the method is implemented as a computer program or a set of computer programs, activated by the practitioners using the practitioner's user interface of the CS System. As with the other phases of the engagement method, the CS System proposes to execute a succession of functions, activated sequentially or independently. At the end of each step, the CS System memorizes the data environment of a client for the steps already executed.

During the execution of the built & execute phase, the practitioner is supported by the CS System. According to the preferred embodiment, the practitioner starts the built & execute phase by selecting the built & execute function in the practitioner's user interface of the CS System. The computer logic of the CS System programs will guide the practitioner through the build & execute phase step-by-step, first by supporting the choice between reuse or new development (510), then adapting (520) or building (530) itself. The solution execution itself is performed with no specific support by the CS System and will therefore not be described.

The first step of the build & execute phase is to decide whether an existing solution will be adapted to the specific client's needs, or if a new solution should be built specifically for the client (500). The information that is needed to make this decision is collected during the design & propose phase and stored into the CS System databases, according to the preferred embodiment. Once the built & execute function is selected the CS System will therefore ask the practitioner if an existing solution should be used and adapted to the specific client's needs, or if a new solution should be built to accommodate the specific client's needs (test 510). In the current description of the preferred embodiment the case in which an existing solution will be used and adapted (520) will be described first, and next the case in which a new solution needs to be build (530). In both events the information stored in the local workspace during the design and propose phase is used.

Once the function "existing solution" (520) is selected from the menu of the practitioner's user interface of the CS System, the practitioner is presented with all relevant information regarding the solution that was selected for the present client during the assessment phase and the design and propose phase. This information is displayed on a workstation display and represented in the practitioner's personal workspace. The practitioner can adapt the solution to fine tune it to the specific client's needs in various ways: by adapting existing workproducts & services, by omitting specific workproducts and services or developing new workproducts. To judge if the adaptations are still within the boundaries of reuse or that a new solution should be developed the practitioner uses his knowledge and experience. When a reused or adapted solution is upgraded to the Solution & Workproduct database the link to the original solution becomes active. This is described in more details in FIG. 16. To assist the reuse of workproducts a search function is available. The function to search for workproducts is described later, because it is generic for adapting an existing solution and building a new solution. Once a workproduct has been selected according to the description of the preferred embodiment, the system moves the workproduct from the CS System database it resides in, to the personal workspace of the practitioner. The content of the workproduct is made visible and editable through the practitioner's user interface of the CS System. The practitioner modifies the content of the workproduct according to the specific client's needs. The modified workproduct may not contain data that identifies the specific client. The CS System links the adapted workproduct to the original solution. When the new solution is upgraded in the Solution & Workproducts database the link becomes active.

Once the function "Build a new solution" (530) is selected from the menu of the practitioner's user interface of the CS System, the practitioner can search for existing workproducts or create new workproducts. When a new workproduct is built it resides on the in the personal workspace of the practitioner in the CS System. The workproduct may not contain data that identifies the specific client. The practitioner may also search the CS System for existing workproducts. This function is described next.

To search for existing workproducts in the CS System, either to adapt them or to reuse them without adaptation, the CS System offers a search function. In the preferred embodiment, there are three major search categories according to the level of maturity of workproducts: workproducts that have been used in a solution of which the effect has been positively evaluated by a client (these reside in the Workproducts & Solutions Database of the CS System), workproducts that have received a positive client satisfaction evaluation individually, but that have not yet received an effect evaluation (these reside in the Candi-database of the CS System), and workproducts that have been used in evaluated solutions but that have not been used for some period (these reside in the old-and-forgotten database of the CS System). Within each of the workproduct categories, the practitioner can search for a workproduct using search criteria related to a solution: Engagement Effect, Known Client Issue, and Ability Gap. Alternatively, the practitioner can select a workproduct from a list of all workproducts.

According to the method described in FIG. 5, the next step of the "built and execute" phase of the engagement is solution execution (540). This step ends when all activities that have been agreed upon to be executed to reach the Agreed Engagement Effect have been performed.

Figure 6:
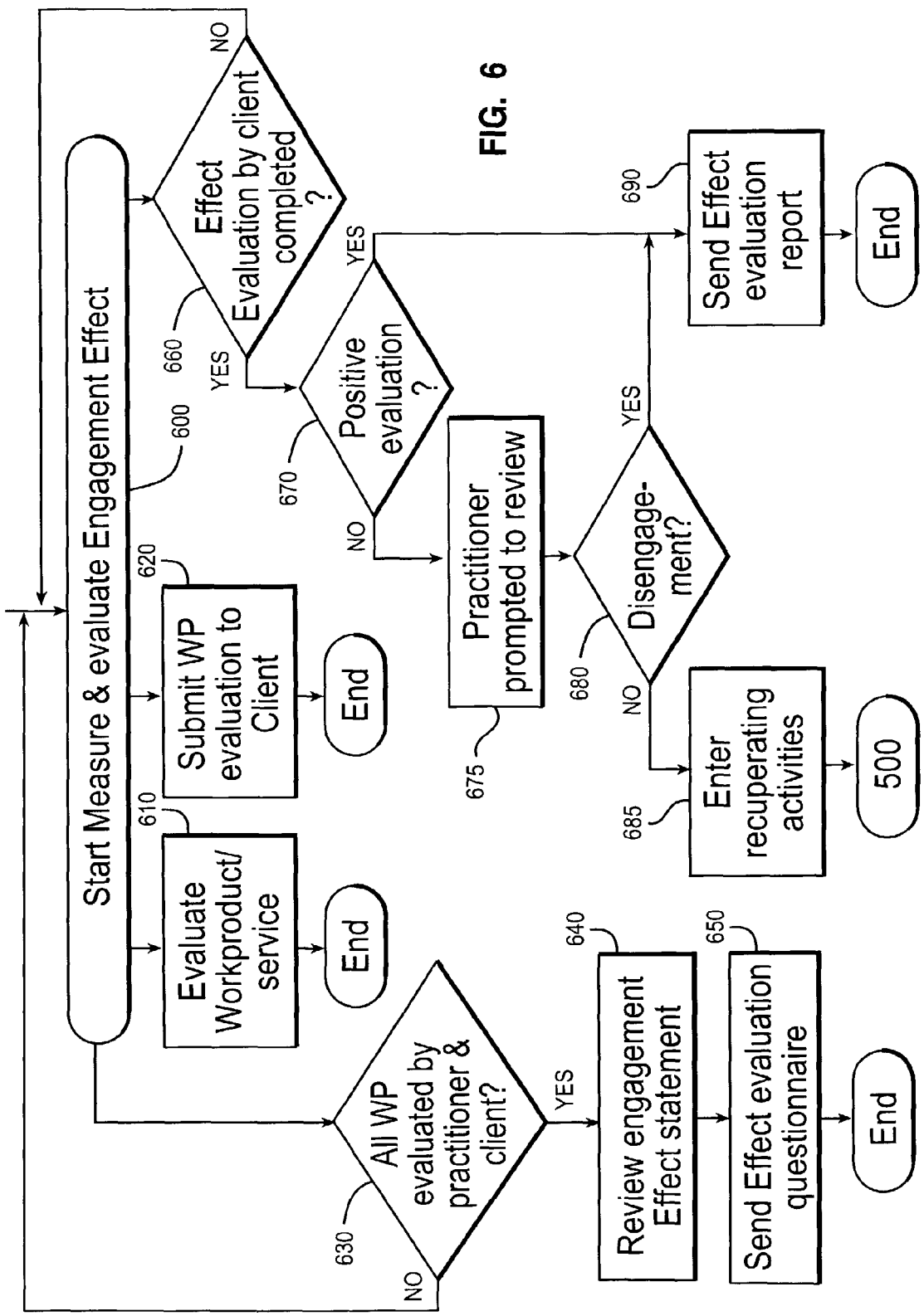
FIG. 6 is the flowchart of the method used by the practitioners to measure and evaluate the effects of the solution proposed and executed.

FIG. 6 is the flow chart of the method used by the practitioners to measure and evaluate the agreed engagement effect. During the execution of the Measure & Evaluate phase, the practitioner is supported by the CS System. According to the preferred embodiment, the practitioner starts the Measure & Evaluate phase by selecting the Measure & Evaluate function in the practitioner's user interface of the CS System. The computer logic of the CS System programs will guide the practitioner through the measure & evaluate phase step-by-step.

Once the Measure and Evaluate function of the CS system is selected (600) the practitioner can choose the option to evaluate workproducts/services (610). The workproducts and services can be evaluated by the practitioner and by the client. If the practitioner selects the Option to have a client evaluate a workproduct or service, the CS System generates an evaluation questionnaire and a notification is send to the client. The notification requests the client to fill in the online workproduct evaluation form for this workproduct or service. The system sends out a first reminder after a first period of time "a" if the evaluation has not been performed. The system sends out a second reminder after an 'a+b' period of time, also notifying the practitioner who is the engagement leader. The client fills out this questionnaire and enters the results into the CS System through the client's interface of the CS System (this function is dealt with in the client flow, FIG. 7). Within the CS System the evaluation results are made available to the workproduct, service or solution owner and is added to the workproduct or solution description. The practitioner may also evaluate a workproduct or service. To do so, the practitioner selects the function 'evaluate workproduct/service' (610) from the menu of the practitioner user interface of the CS System. The evaluation is made available to the workproduct owner or service owner and to the owner of the solution that the workproduct or service is part of. The evaluation information is added to the workproduct description and/or the service description. If appropriate 'credits' can be awarded to the owner(s). These credits are added to the Certification Bank Account of the owner(s). This is part of the 'practitioner certification' functionality which will be addressed in more detail in reference to FIG. 17.

The next step in the measure & evaluate phase is to prepare the Effect evaluation. The system first check (630) if the practitioner and the client have entered the evaluation on all the workproducts and services. If the evaluations on workproducts and services are not completed (answer No to test 630), the practitioner is not authorized to continue. If the evaluations on workproducts and services are completed (answer Yes to test 630), the practitioner reviews (640) the Effect statement. The Effect Statement which was agreed by the practitioner and the client during the 'Build & Propose' phase (FIG. 5), is displayed on the display of the practitioner's workstation. If the practitioner thinks that a revision of the Engagement Effect Statement is justified, then he modifies the statement and the client is notified with an e_mail message in the preferred embodiment. The client will have to approve or refuse the new statement as described in reference to FIG. 7. Then, when the Effect statement has not been changed or has been changed and approved, the practitioner prepares (650) the Engagement Effect Evaluation Questionnaire on the basis of the Effect statement just reviewed. Through the user interface of the CS System, the practitioner can modify the model questionnaire displayed on the screen to accommodate for the specific client and engagement situation. When the questionnaire is ready, a notification is send to the client that he can fill out the online engagement effect questionnaire (see FIG. 7). The notification requests the client to fill in the questionnaire evaluation for the effects. The system sends out a first reminder after a first period of time "a" if the evaluation has not been performed. The system sends out a second reminder after an 'a+b' period of time, also notifying the practitioner who is the engagement leader.

The practitioner can select the Solution Evaluation Report function from the menu of the User Interface of the CS System. The system checks if the Effect evaluation by the client is completed. If the evaluation is not completed (answer NO to test 660), the practitioner cannot go on in this function. If the Effect evaluation by the client is completed (answer Yes to test 660), the evaluation data and comments are retrieved from the CS System and displayed on the practitioner's workstation. This evaluation data includes the answer (yes or no) entered by the client indicating if he agrees that the Engagement Effect was or was not met. If the Engagement Effect is met, according to the client, the evaluation is positive (answer yes to test 670) and an Effect evaluation report generated by the CS system and sent to the client (690). The evaluation report contains, among other information, the effect evaluations, the workproduct, service and solution description(s) used in the engagement, the results of the workproduct and service evaluations, the practitioners, and workproduct, service and solution owners involved. The evaluation information triggers automated data maintenance processes within the CS System. These automated system process are described in more detail in FIG. 12, FIG. 16 and FIG. 17. The information that is displayed on the display of the practitioner's interface of the CS System can be sent automatically to those involved or printed in paper. Once this report is sent the Effect evaluation function and the engagement is ended.

If the client has not provided a positive evaluation (answer No to test 670), the practitioner is prompted by the system to review (675) the details of the evaluation of the practitioner. An analysis of the causes of not meeting the agreed Engagement Effect is required to be entered in the CS system. To determine the cause of failure, an interview with the client is conducted. When both client and practitioner agree that recuperating actions can be undertaken to reach the agreed Engagement Effect, the practitioner answers no to the question "disengagement?" asked by the system (answer No to test 680). The practitioner is invited by the system to enter recuperating activities in the system (685). When this step is completed, the system proposes the practitioner to restart a 'Build & Execute' function (500 to 540) as described in reference to FIG. 5.

If the client and the practitioner agree that no recuperating actions can be undertaken to reach the agreed Engagement Effect, the practitioner updates the system with this information by answering Yes to "disengagement?" asked by the system (answer Yes to test 680). A standard negative Solution Evaluation Report is constructed and sent (690) to the client and management of the solution provider; the automated data maintenance processes are executed within the CS System.

Figure 7:
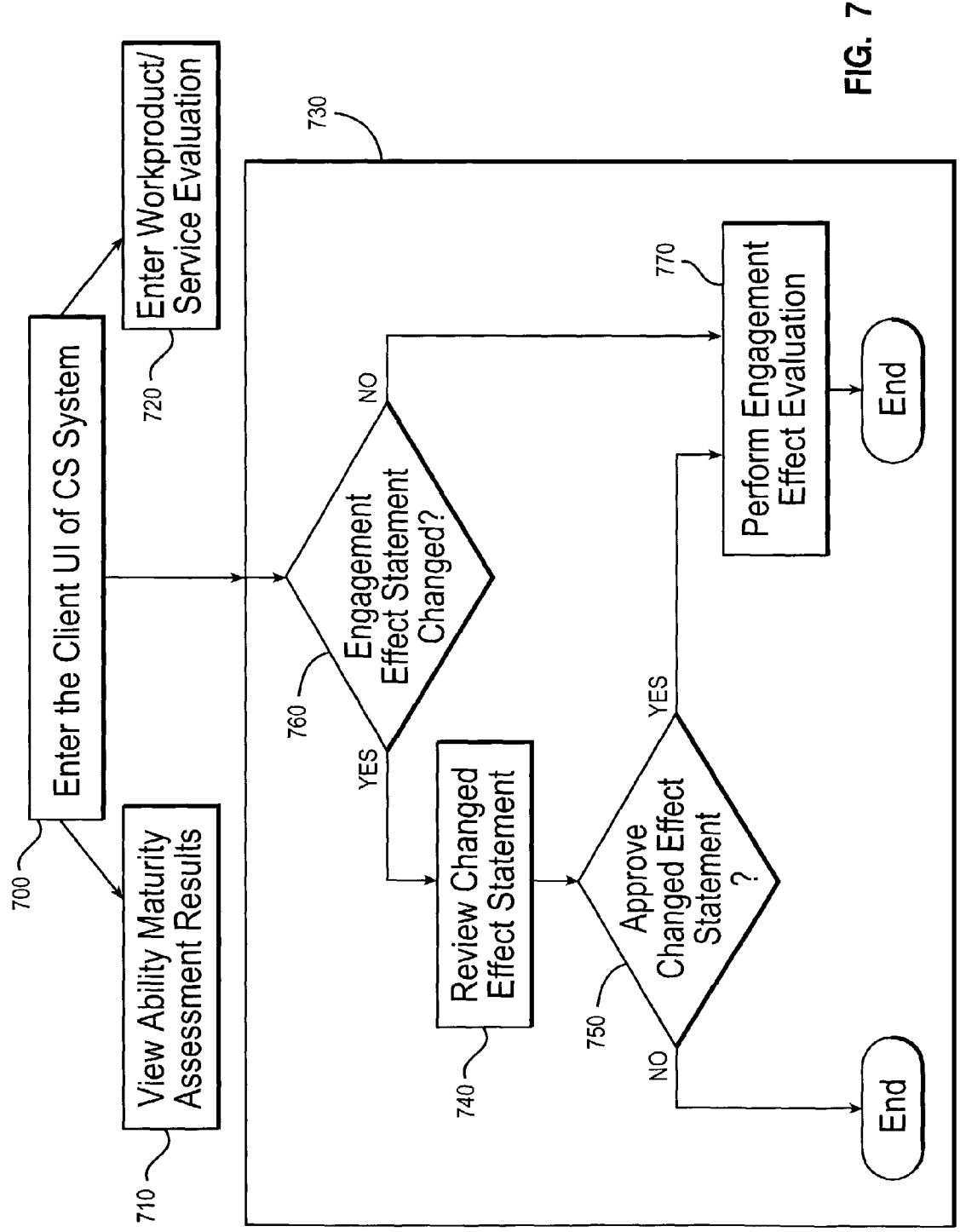
FIG. 7 is a flowchart of the method used by the client to access the system of the preferred embodiment.

FIG. 7 is the flow chart of the method used by the client user group (150). The client starts his user interface (700). As illustrated in FIG. 7, there are three independent functions that the client activates from his user interface to the system (710, 720, 730). These three functions are always activated in the same sequence order by the client and always upon a request from the system. The first function is for viewing the results of assessment performed by the practitioner (710). This step is performed during the assessment phase at the end of step 340 when the practitioner has completed his assessment analysis by collecting from the computer the management ability maturity gap and the feasibility level. At the end of step 350, the computer generates and sends a message to the client workstation, using the communication tools of the system. The communication tools of the preferred embodiment is an e-mail sent via Internet because this is the most common communication network usable by the clients. The client is informed by this message that the assessment results can be viewed on the system. The client, accesses the system and selects the assessment report function from the menu of his user interface with the system. The client views or print the assessment report issued by the system. This report contains 'visuals' of the assessment results which have been obtained by the practitioner in the assessment phase with the help of the computer. The report contains figures, data and text explaining the results. This report is specially made for the client. The client will use it as input for deciding on the engagement effect data with the practitioner. It is noted that the next step performed by the practitioner in the assessment phase, following the use of this report, is the step of entering the agreed engagement effect data in the system (350 in FIG. 3).

The second function that the client activates on his user interface is for "workproduct/service evaluation" (720). During the measure and evaluate effects phase, the practitioner through his own user interface asks the client to enter his feedback on the workproducts (step 620 in FIG. 6). He receives a first reminder after period "a" and a second reminder after period "a+b". The client accesses the system and selects the workproduct/service evaluation function from the menu of the client end user interface. The client performs the evaluation of the workproduct or service. The system sends this just entered feedback to the workproduct/service owner and the solution owners and links this feedback to the workproduct/service description in the corresponding data base.

Finally the client performs the effect evaluation (730) through the engagement effect evaluation questionnaire prepared by the practitioner during the measure and evaluate effects phase. As part of the preparation of the engagement evaluation the practitioner can decide to change the engagement effect statement (640). When the effect statement is changed, the client is automatically notified by the system. The client has to approve the change before it is accepted by the system. Then, when the practitioner has prepared the evaluation questionnaire (650), the client receives a notification to inform him that he can perform the effect evaluation. He will receive reminders after period "a" and period "a+b".

The client intending to (dis)approve the changed effect statement or to evaluate the effect, selects the Engagement Effect Evaluation function (730) from the menu of his user interface. If the system has not sent a notification that the Engagement Effect Statement has changed (answer no to test 760 performed by the system), the client is directly required by the system to fill in the engagement effect evaluation questionnaire (770). If the client has received a notification from the system (answer yes to test 760 performed by the system), the changed engagement effect statement is displayed on the screen by the system. The client is required to enter in the system that he approves it or disapproves the change. If the client enters that he disapproves the change (answer N to test 750), the system notifies the practitioner who is the engagement leader that the client has disapproved the change. In that case, the practitioner has to redo the 'Review Engagement Effect Statement' (640) and the client will have to redo the Effect Statement Evaluation function (730).

If the client enters in the system that he does approve the changed engagement effect statement (answer Y to test 750), the system notifies the practitioner who is the engagement leader that the client has approved the change. Then the client is required by the system to fill in the engagement effect evaluation questionnaire (770) that the he will be able to view through his user interface.

Figure 8:
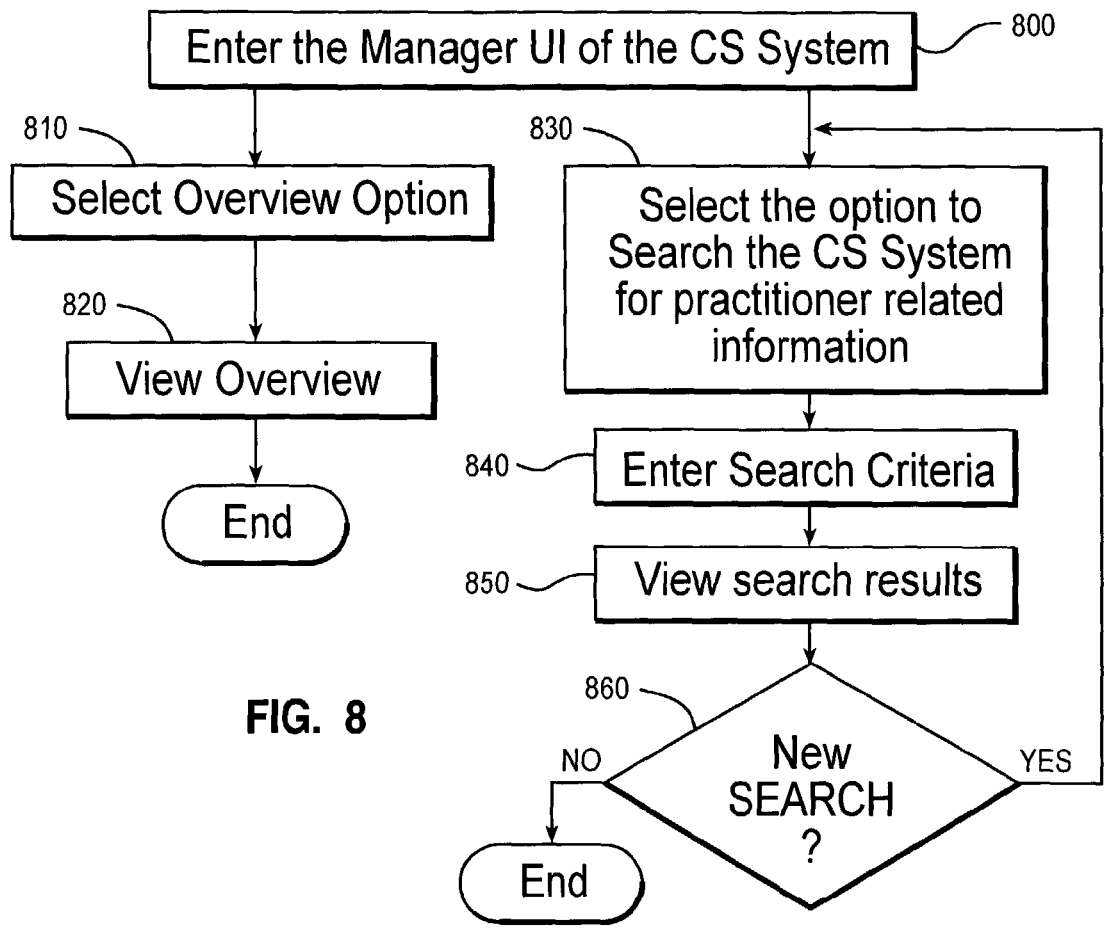
FIG. 8 is a flowchart of the method used by managers of the consulting and service provider to access the system of the preferred embodiment.

FIG. 8 is a flowchart illustrating the user interface of the manager user group (140). The manager can use this interface to review his practitioners. When the manager starts the user interface (800) he can activate two possible functions (810-820 and 830 to 860). The first function is the "overview" option. When the manager selects the overview option (810) he has a list of all the practitioners reporting to him. He can have an overview of the information related to each practitioner of the list. Such information, in the preferred embodiment are described as the data elements for the practitioner in FIG. 21. This data element is part of the "practitioner database" according to the preferred embodiment. More particularly, the manager can view the number of credits awarded to the practitioner ("credit bank account" field in FIG. 21). The manager can also see the "certification status" (field of the data element of FIG. 21) which is a level corresponding to a computation based on the number of credits and the difficulty of the engagement where the practitioner has won the credits. The Credit bank account and the Certification status are updated automatically by the CS System during the engagement phase. Other information that is part of the overview is the solution, workproducts and, in some cases, the services of which the practitioner is owner, and the evaluations of these products.

The manager can also activate from the user interface the "Search" function (830). He can then enter search criteria (840) such as the practitioner name, the practitioner role and the practitioner certification status. The data element of the practitioner database corresponding to the practitioner found is then displayed (FIG. 21). The manager can then either request a new search (answer yes to test 860) and perform the search function again (830). The manager can also exit the user interface (answer no to test 860).

Figure 9:
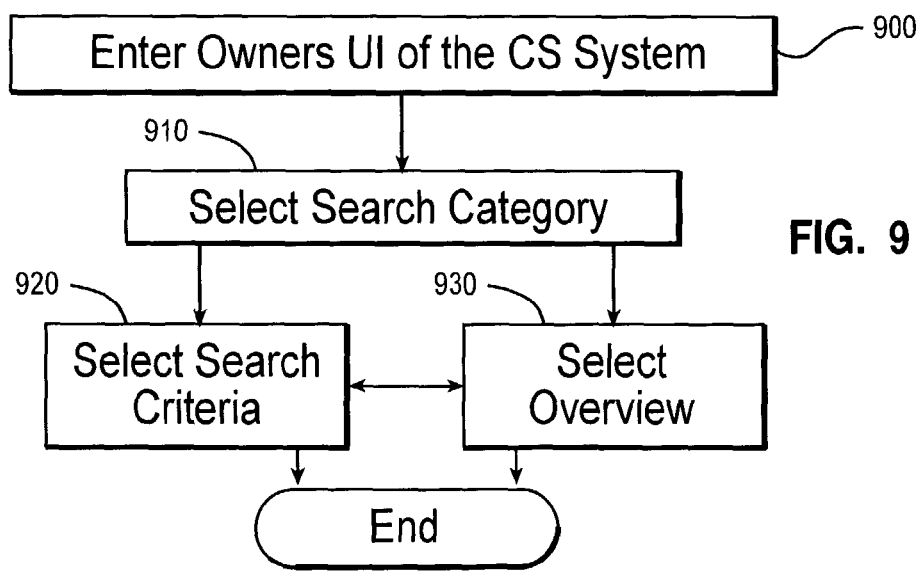
FIG. 9 is the flowchart of the method used by the solution/workproduct/service owner to access the system of the preferred embodiment.

FIG. 9 is the flowchart describing the user interface used by the practitioners who are solution, service or workproduct owners ("owners") (160). When the "owners" activate the user owners interface of the CS System (900), the CS system displays a category selection function. The system allows to select a solution that the owner owns, and/or a workproduct that the owner owns, and/or a service that the owner provides. The systems also allows to select the credits that the owner has gained as a result of his ownership, and (re)use of his products and the evaluations they have received.

Once one or more categories are selected, the CS System owner's user interface offers the two options: to see a list of all data elements in the selected categories (overview, 930), or to select search criteria (920).

When the owner selects the option to see the overview (930), the owner's user interface displays a list of all data elements in the CS System databases that belong to the selected categories (see FIG. 18A to FIG. 23). From this list, the owner can click on a specific data element to access the information as described by the field descriptions in FIGS. 18A to 23.

When the owner selects the option to specify search criteria a list of data elements will be displayed by the owner's user interface in a similar fashion as described above, but limited to the data-elements that adhere to the search criteria. The search criteria are picked from a list of all possible criteria for each category. The criteria correspond to the field descriptions of the data elements described in FIG. 18A to FIG. 23.

Once a list has been displayed the owner can a) end the interaction, b) repeat the step he has just performed, or c) change from 'overview' to entering search criteria or vice versa.

The Core Team user group (130) has a specific user interface with a maximum of authorization over the system. It is noted that each group of users as described in FIG. 1 and in the figures describing the user interfaces has constricted access to the information in the tables and databases in the CS System. The Core Team can access any data of the system, except the local personal storage of the practitioner. The Core Team accesses the "parameters" of the system because they can change the rules and the values. They can change also the questionnaire models. The Core team members can also access the CS system through the practitioner user interface, but only when they act as practitioners for an engagement. They can also review the practitioner community and they use for this the user interface that the managers use as described in FIG. 8. The only difference is that the Core Team members access all the practitioner community as one manager can only access the information on the practitioners who report to him.

Figure 10:
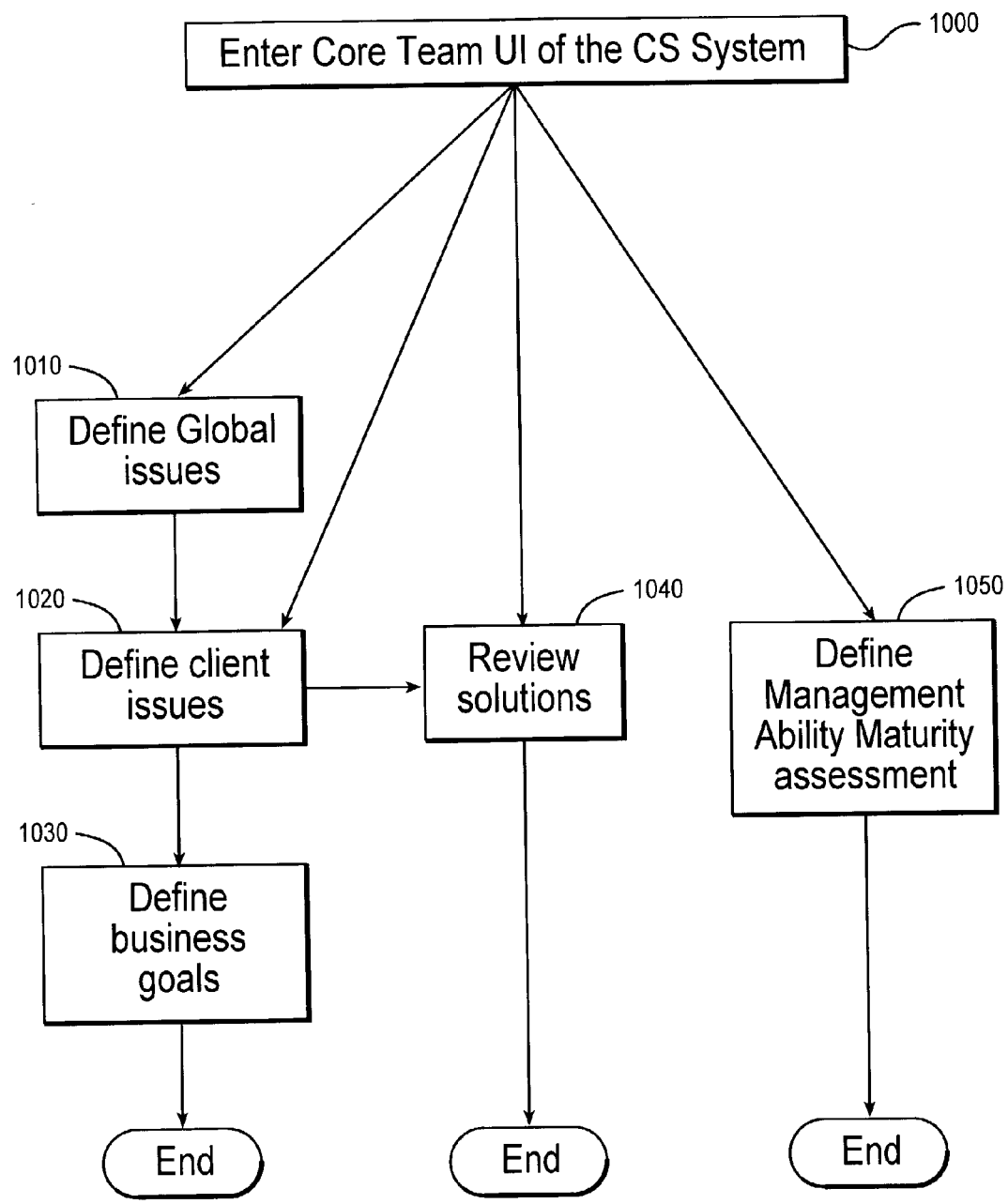
FIG. 10 is the flowchart of the method used by the "core team" to update the system content according to the preferred embodiment.

FIG. 10 is the flowchart describing all the other functions accessible by the Core Team members activating their user interface (1000) for update of CS System content. The Core Team can decide to make these updates according to changes in the market or according to new information about the issues entered by the practitioner in the CS System during the assessment of the client situation. When the "Define global issues" function is selected (1010), a list of the global issues currently stored is displayed on the screen. This includes a list of proposed global issues by practitioners, which the Core Team has to approve. The Core Team member can update the list by adding, suppressing, modifying elements of the list. The CS System prompts review of the client issues that are linked to the global issues which are removed or changed. The CS System prompts the Core Team member to define client issues when a new global issue is added. At the end of this step, the changes are stored in the system. The "define client issues" function (1020) is activated either from the menu of the user interface (1000) or during the definition of global issues (1010). At activation of the "define client issues' function (1020), a list of the client issues currently stored is displayed on the screen. The Core Team member can update the list by adding, suppressing, modifying elements of the list. The CS System prompts the Core Team member to remove global issues that have no longer client issues related to them. The CS System prompts the Core Team member to review existing solutions (1040) that are linked to updated client issues and, where needed, link them to the other client issues. Optionally, the Core Team can also receive a prompt to review client issues that have been added by practitioners during engagements. At the end of this step, the changes are stored in the system.

The system then, proposes to the Core Team member to define business goals (1030). The "define business goals" function can also be accessed from the menu of the user interface (1000). At activation of the "define business goals" function (1030), a list of the business goals currently stored is displayed on the screen. One of the options is that the Core Team can review business goals that have been added by practitioners during engagements. The Core Team member can update the business goal list by adding, suppressing, modifying elements of the list. The CS System prompts the Core Team member to add ability maturity levels to business goals which are changed or added. At the end of this step, the changes are stored in the system. This is the last step for update of reference parameters linked together which are Global issues, client issues and Business goals.

The Core Team member can start another function from his user interface to define Management Ability Maturity Assessment (1050). The Core Team member when activating the function is proposed to review the questionnaire models, the link between questions result and management ability maturity level. At the end of this step, the changes are stored in the system.

The Core Team member can also activate the "solution review" function (1040) from the user interface, or this function can be activated by the system during the execution of the step of defining client issues (1020). The Core Team member can search for a list of solutions by entering search criteria. It should be noted that the list of solutions is already chosen by the system when the "review solution" function is activated during the "define client issues" (1020) function execution. In both cases, a solution can be chosen on the screen and the solution fields which need to be updated are modified. The fields of the solution information which can be updated are described in the data element of FIG. 18. At the end of this step, the changes are stored in the system.

Figure 11:
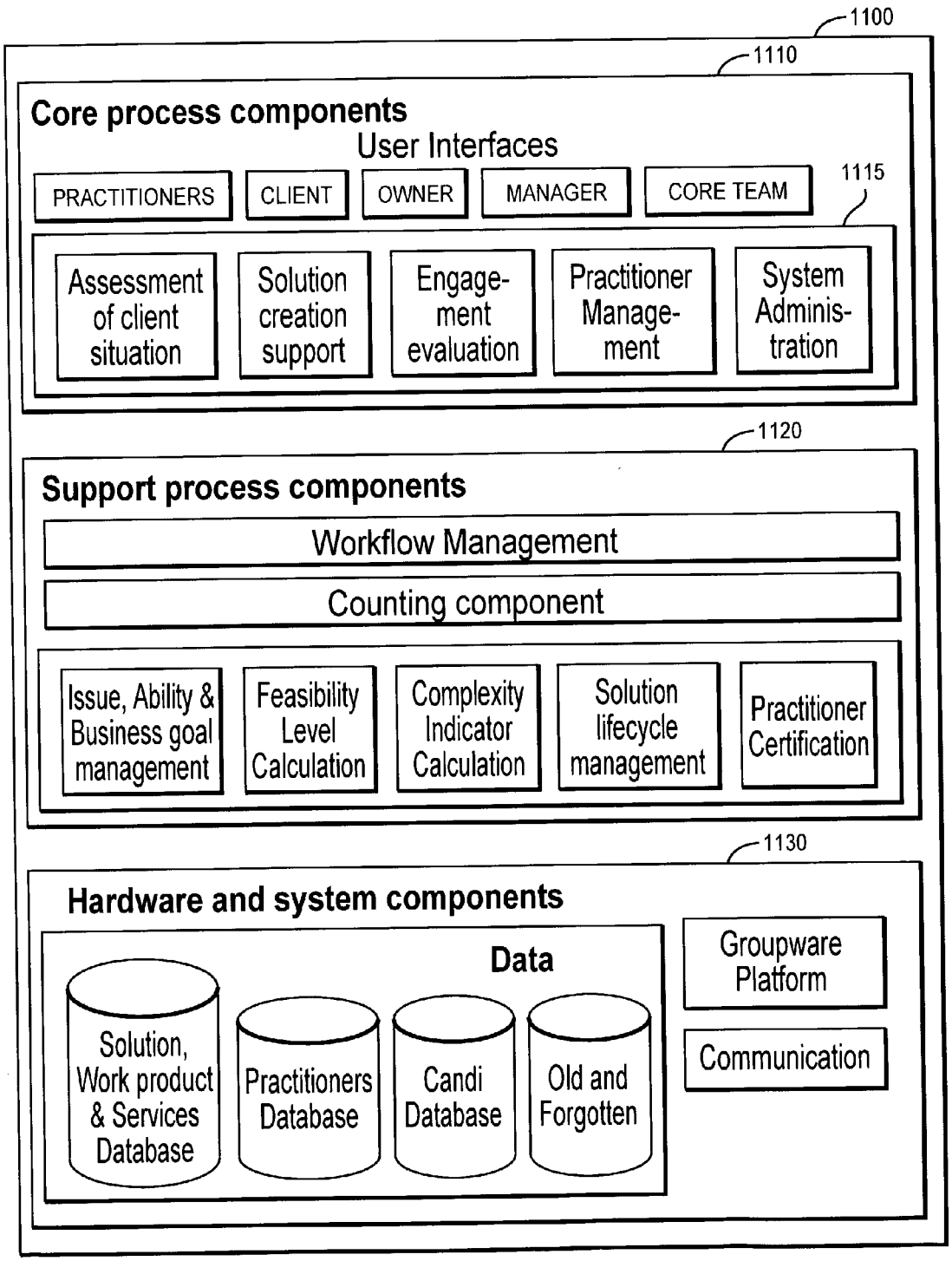
FIG. 11 is an high level architectural overview of the system of the preferred embodiment.

FIG. 11 shows an architectural overview of the CS System according to the preferred embodiment. The system (1100) comprises three layers of programs the Core Process components (1110), the Support process components (1120) and the Hardware and system components (1130). The first layer is accessed by the different groups of users of the system. It comprises the user interface components that have been described from FIG. 3 to FIG. 10. Basically, each user interface activates one or more of basic components (1115) which are five in the preferred embodiment. The assessment component is activated by the practitioner and the Core Team user interface. This component context comprises the assessment functionality and the corresponding reference parameter tables. The Solution creation support component is used by the practitioner, by the owner and the Core Team user interfaces. The context of this component comprises the local personal space of the practitioner and the search and copy functionality which is used on the databases. The engagement evaluation component is activated by the practitioner and the client user interfaces. The context of this component includes the evaluation functionality, the questionnaires and the corresponding reference parameter tables. The practitioner management component is activated by the manager and the Core Team user interfaces. The context of this component includes the search functionality and the practitioner database. The system administration component is activated by the Core Team user interface. The context of this component comprises all reference parameter tables and all four databases in preferred embodiment.

Figure 12:
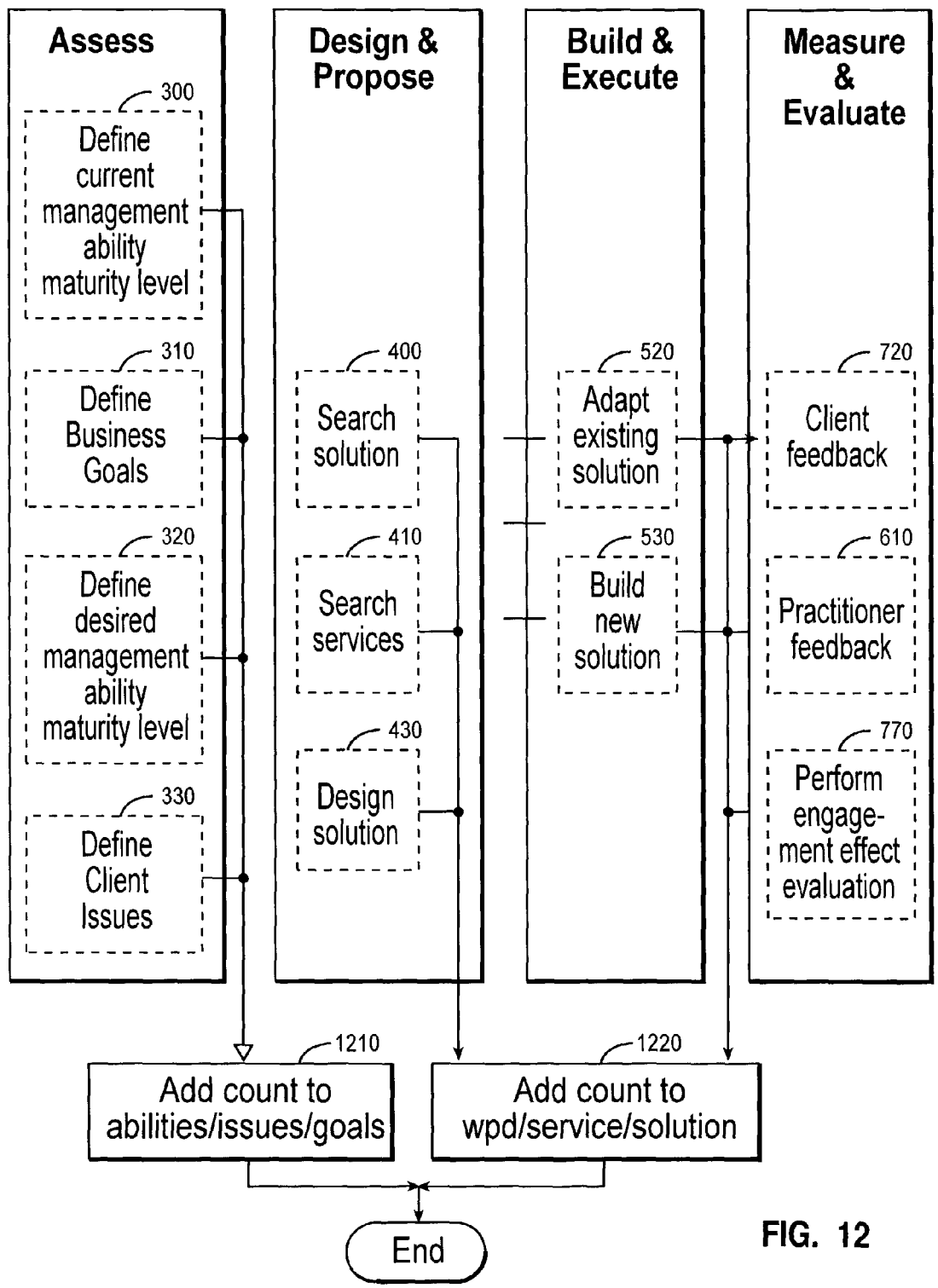
FIG. 12 is a flowchart providing a logical overview of the automated counting component of the system according to the preferred embodiment.

The second layer of the CS System (1120) comprises a workflow management to allow communication between components of the system. A person skilled in the art knows how to develop this function in the system with existing solutions. A counting component is also part of this second layer because a counting function is automatically activated by the basic components (1115) during the execution of the practitioner user interface. As described later in the document, FIG. 12 illustrates how different steps of the practitioner user interface method triggers two counting functions (1210, 1220) of the counting component. Finally, the second layer of the system comprises five components for the five automatic functions on the databases of the system during the execution of the different user interfaces. FIG. 13 to FIG. 17 illustrates these automatic functions executed by the system and the relation with the user interface steps which triggers them. It is noted that in FIG. 12 as well in the FIG. 13 to FIG. 17, are illustrated the relation between the automatic functions of the system of layer 2 and the user interface steps. In the real implementation, the user interface steps does not trigger directly the components as they are using the intermediate basic components (1115). But for simplification and a better clarity in the explanation the basic components intermediately activated are not cited.

The third and last layer of the system is the hardware and system component. This layer comprises the data bases which are four in the preferred embodiment. The data elements of FIG. 18 and FIG. 19 are found in the "Solution, Workproducts & Services" database, the "Candi-database" and the "Old and Forgotten Database". The practitioner data element described in FIG. 21 is used in the practitioner database. It is noted that the data element for the engagement as described in FIG. 22 and the data element for the client as described in FIG. 23 are traditional databases which can be found in any company storing information on customers (client) and activities (engagement). This is used for archives, statistics and by any practitioner desiring starting an engagement with a client and wanting to check what was the history of his company with this client. The service data element as described in FIG. 20 can be also used in a service database if the volume of data requires it.

Coming back to FIG. 11, the third layer of the CS System comprises a Groupware platform. This platform maybe the Lotus Smartsuite of IBM and is necessary to the different user groups to communicate (Lotus Notes), to perform document processing in personal storage (Lotus WordPro, Lotus Freelance Graphics). Any other Groupware platform having equivalent functionalities can apply to the CS System. As specified in reference to step 430 of FIG. 4, CRM tools may be also integrated in these tools as usually done in the IT industry.

The last component of the third layer of the CS System is the communication component. The communication component supports each of the above described CS system components. This component may include, electronic data and software distribution, messaging, Internet technology, diskettes and CD-ROM and wireless technology technology. It supports remote access communications. If the various components are implemented on different platforms, communication between the platforms must also be handled. It is noted that each of the components and associated modules may be configured to operate in a multinational environment to facilitate management and organization consultancy and services engagements in various countries.

FIG. 12 shows the flow chart of the method used by the system to do automatic counting of events. Counting is done to collect information about usage of the CS System. It is input for other automated system actions and it enhances the intelligence of the system. This information is also an input for the core team user group. In general, the CS system and the core team use this information to analyze the quality of the content and setup of the system.

In the preferred embodiment, the counting function is implemented as a computer program or a set of computer programs, activated automatically by events created by one of the user groups. The CS System proposes to execute a succession of functions, activated sequentially or activated independently.

During each phase of an engagement, practitioners and client users interact with the CS system. A number of these actions are registered by the system and counted. When, during the assess phase (200), the client issues (330), business goal (310) and management ability maturity levels (300, 320) are defined in the system, the automatic count process is triggered (1210). When a client issue is defined (330), the counting process adds a point to this client issue in the count field of the client issues list. This field reflects the total number of times a client issue is found in client engagements. Because client issues are related to global issues, global issues are automatically counted at the same time. The same process takes place when a business goal is defined (310). A point is added to this business goal in its count field in the business goal list. The current and the desired management ability maturity levels (300,320) are also counted and stored in the system.

During the 'design and propose phase' (210), 'build and execute phase' (220) and the 'measure and evaluate phase' (230) a number of actions take place which are counted. This results in the system to add a point to reused and new workproducts, services and solutions (1220). Whenever a workproduct, service or solution is counted by the counting function, the event which caused the count and the count itself is a stored in the Candi or the "Workproduct, Solutions & Services" database.

When in step 'Search for an existing solution' (400) a solution and its workproducts and services are consulted a point is added to the count field of this solution and these workproducts and services by the count function (1220).

When in step 'Search for an existing service' (410) a service is consulted a point is added to the count field of this service by the count function (1220).

When in step 'Design the solution' (430) workproducts, services and/or solutions are consulted, reused or adapted a points are added to the count field of this workproduct, service or solution by the count function, depending on the level of reuse(1220).

When in step 'Adapt existing solution' (520) workproducts, services and/or solutions are reused or adapted points are added to the count field of this workproduct, service or solution by the count function, depending on the level of reuse(1220).

When in step 'Build new solution' (530) workproducts and/or services are consulted or adapted a point is added to the count field of this workproduct, service or solution by the count function (1220).

In the step 'client evaluation of workproducts' (710) the client can evaluate the executed workproducts. When a workproduct gets a positive evaluation, the count function adds a point to the count field of this workproduct (1220).

In the step 'Practitioner evaluates workproduct' (610) the practitioner can evaluate the executed workproducts. When a workproduct gets a positive evaluation, the count function adds a point to the count field of this workproduct (1220).

In the step 'Client evaluation of Engagement Effect' (770) the client evaluates the effect the solution has generated. When a solution gets a positive engagement effect evaluation, the count function adds a point to the count field of this solution and related workproducts and services (1220).

Figure 13:
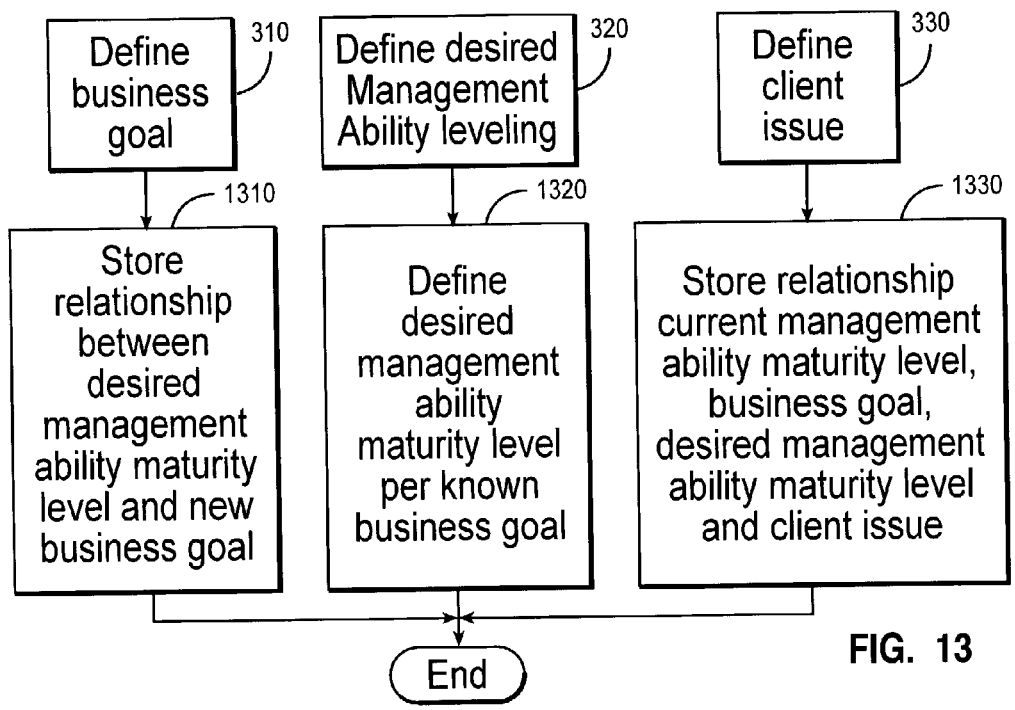
FIG. 13 is a flowchart providing a logical overview of the "Issue, Ability & Business goal" component of the system according to the preferred embodiment.

FIG. 13 is the flow chart of the method used by the system to do 'issue, ability & business goal management'. Issue, ability & business goal management is done to keep the reference tables up to date and it is done automatically.

In the preferred embodiment, the issue, ability & business goal management is implemented as a computer program or a set of computer programs, activated automatically by events. The CS System proposes to execute a succession of functions, activated sequentially or activated independently.

In the assessment phase the 'define business goals' (310) 'define desired management ability level' (320) and the 'define client issues' (330) steps trigger the 'issue, ability & business goal management' function.

In the step 'define business goals' (310) a new business goal can be defined by the practitioner. The system requires the related desired management ability maturity level to be defined. The relationship between the new business goal and the related desired management ability maturity level is automatically stored by the CS system in the reference tables (1310).

In the step 'define desired management ability level' (320) the CS system produces the desired management ability level that is linked to the known business goal of the client. The relationship between known business goal and desired management ability level has been defined by the core team and is stored in reference tables. When ever a practitioner edits the desired management ability level, this is stored in the system. Every time the relationship between business goal and the desired management ability maturity level is edited the system compares the reference tables with the stored updated relationships between business goal and desired management ability level. When the difference between the reference tables and the stored relationships passes a certain threshold, the system will overwrite the reference tables with the new and up-to-date stored relationship (1320), which has proven itself to be more up-to-date.

In the step 'define client issue' (330) a new client issue can be defined. When this happens the relationship between this newly defined client issue and the related current management ability maturity level, known business goal and desired management ability maturity level is automatically stored in the reference tables by the CS system (1330).

Figure 14:
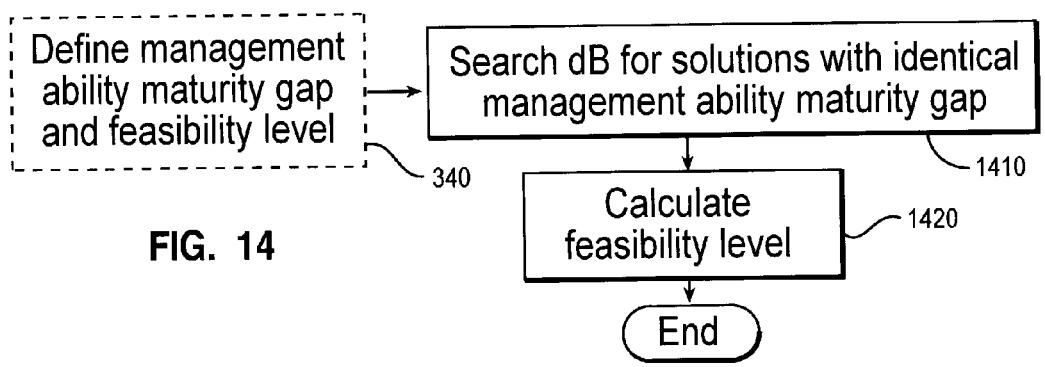
FIG. 14 is flowchart providing a logical overview of the "Automatic feasibility level calculation" component of the system according to the preferred embodiment.

FIG. 14 is the flow chart of the method used by the system to do 'automatic feasibility level calculation'. Automatic feasibility level calculation is input for 'Define feasibility level and management ability maturity gap' (340). In the preferred embodiment, the automatic feasibility level calculation is implemented as a computer program or a set of computer programs, activated automatically by events. The CS System proposes to execute a succession of functions, activated sequentially or activated independently.

When the Management Ability Maturity Gap has been defined in the 'define management ability maturity gap and feasibility level' (340) the automated feasibility level calculation function searches in the 'work product and solution database' for solutions, workproducts and services with identical management ability maturity gaps (1410). The number of solutions, workproducts and services that can close this management ability maturity gap is used to calculate the feasibility level (1420). Using a reference table which has been defined by the core team the system calculates the feasibility level. The result can be:
1. Easy to accomplish
2. Feasible to accomplish
3. Difficult to accomplish
4. Unattainable ideal This is input is for step 'define management ability maturity gap and feasibility level' (340).

Figure 15:
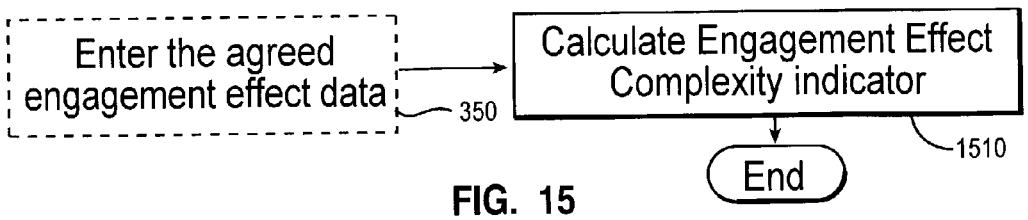
FIG. 15 is a flowchart providing a logical overview of the "Complexity Indicator Calculation" component of the system according to the preferred embodiment.

FIG. 15 is the flow chart of the method used by the system to do 'automated engagement effect complexity indicator calculation'. Automated engagement effect complexity indicator calculation is used by the practitioner certification function in step 'Add credits to practitioner account' (1710). In the preferred embodiment, the automated engagement effect complexity indicator calculation is implemented as a computer program or a set of computer programs, activated automatically by events. The CS System proposes to execute a succession of functions, activated sequentially or activated independently.

When, in the assessment phase, the agreed engagement effect has been entered into the system (350), the CS system automatically calculates the engagement effect complexity indicator (1510). The complexity of an engagement effect is determined by the following factors: the number of abilities that are part of the agreed effect, the agreed ability maturity levels of these abilities to be reached by the solution and the ability gap that has to be closed for each of these abilities. For each of these factors the complexity is defined in reference tables. These tables have been set up by the core team. Using these reference tables the engagement effect complexity indicator is calculated and stored with the solution. This indicator is used in step 'add credits to practitioner account' (1710) of the practitioner certification function.

Figure 16:
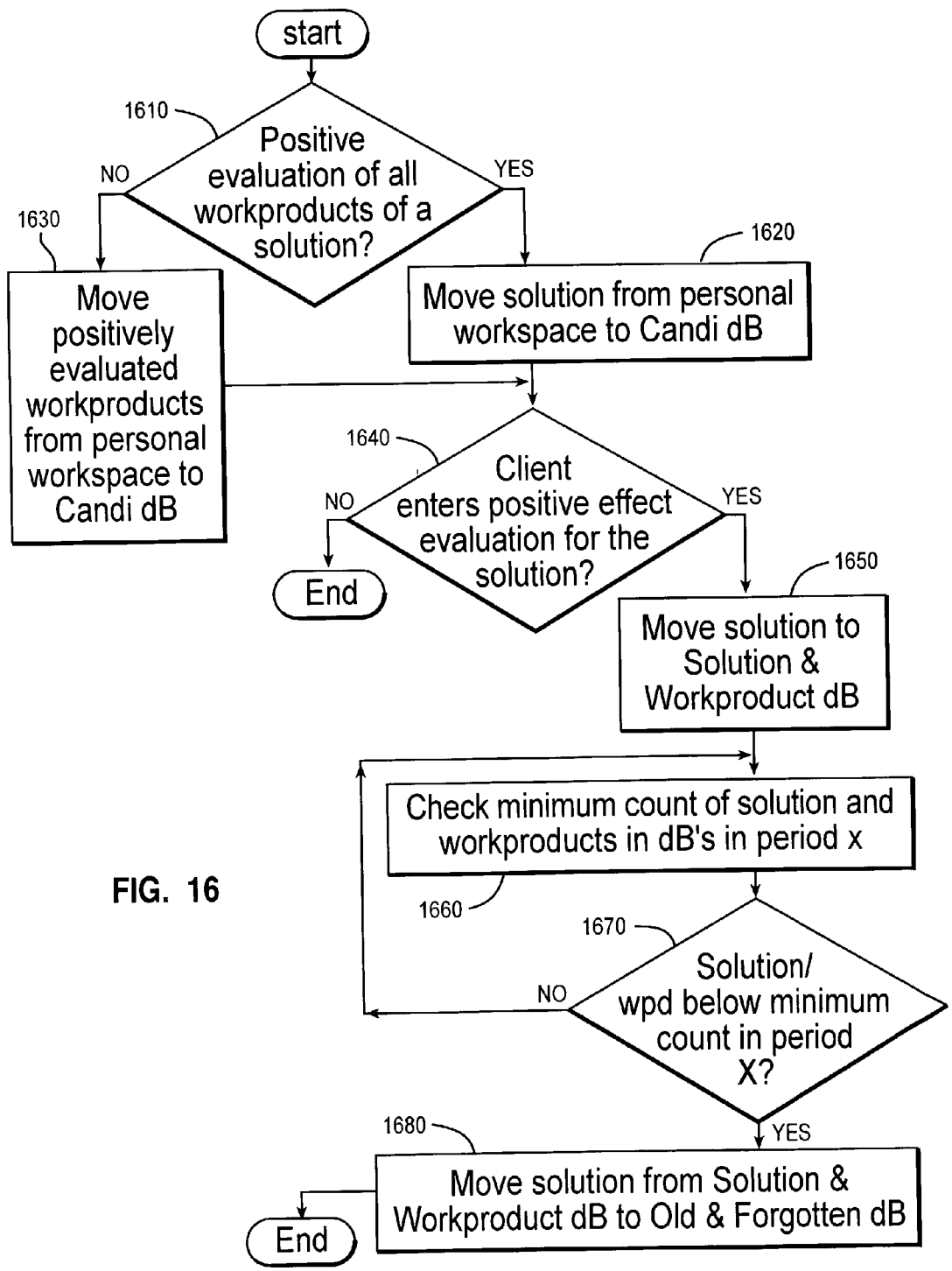
FIG. 16 is a flowchart providing a logical overview of the "Solution Lifecycle Management" component of the system according to the preferred embodiment.

FIG. 16 is the flow chart of the method used by the system to do automatic solution lifecycle management. Automatic solution lifecycle management is done to ensure high-quality and current content in the databases of the CS system. In the preferred embodiment, the automatic solution lifecycle management function is implemented as a computer program or a set of computer programs, activated automatically by events. The CS System proposes to execute a succession of functions, activated sequentially or activated independently. During an engagement the solutions is first entered in the personal work space of the practitioner (430). The moment all workproducts of a solution get a positive evaluation (1610), the solution lifecycle management function will move this solution from the personal work space to the Candi database (1620). When not all workproducts in a solution get positively evaluated, only the positively evaluated workproducts are moved to the Candi database (1630). These workproducts are available for reuse.

When the client enters a positive effect evaluation for a solution (1640), the solution lifecycle management function will move the solution from the personal workspace or the Candi database to the Solution, services and WorkProducts Database (1650). In this step all client specific information is overwritten by the data defined in the design and propose phase (step 430). In the situation where a solution is reused, the link to the original solution becomes active.

The solutions, services and workproducts that are in the Candi database and in the Workproduct, Services & Solution, Services and database are reviewed every period x by the solution lifecycle management function. During this review the amount of times the solution and its workproducts have been counted is compared with the minimum count level (1660). When it is below this minimum count (1670), the solution lifecycle management function moves the solution to the Old and Forgotten Database (1680). When the solution has received a higher number of counts in period x than the minimum level, no action will be taken by the solution lifecycle management function and the solution and its workproducts will be input for the next minimum count review (1660).

Figure 17:
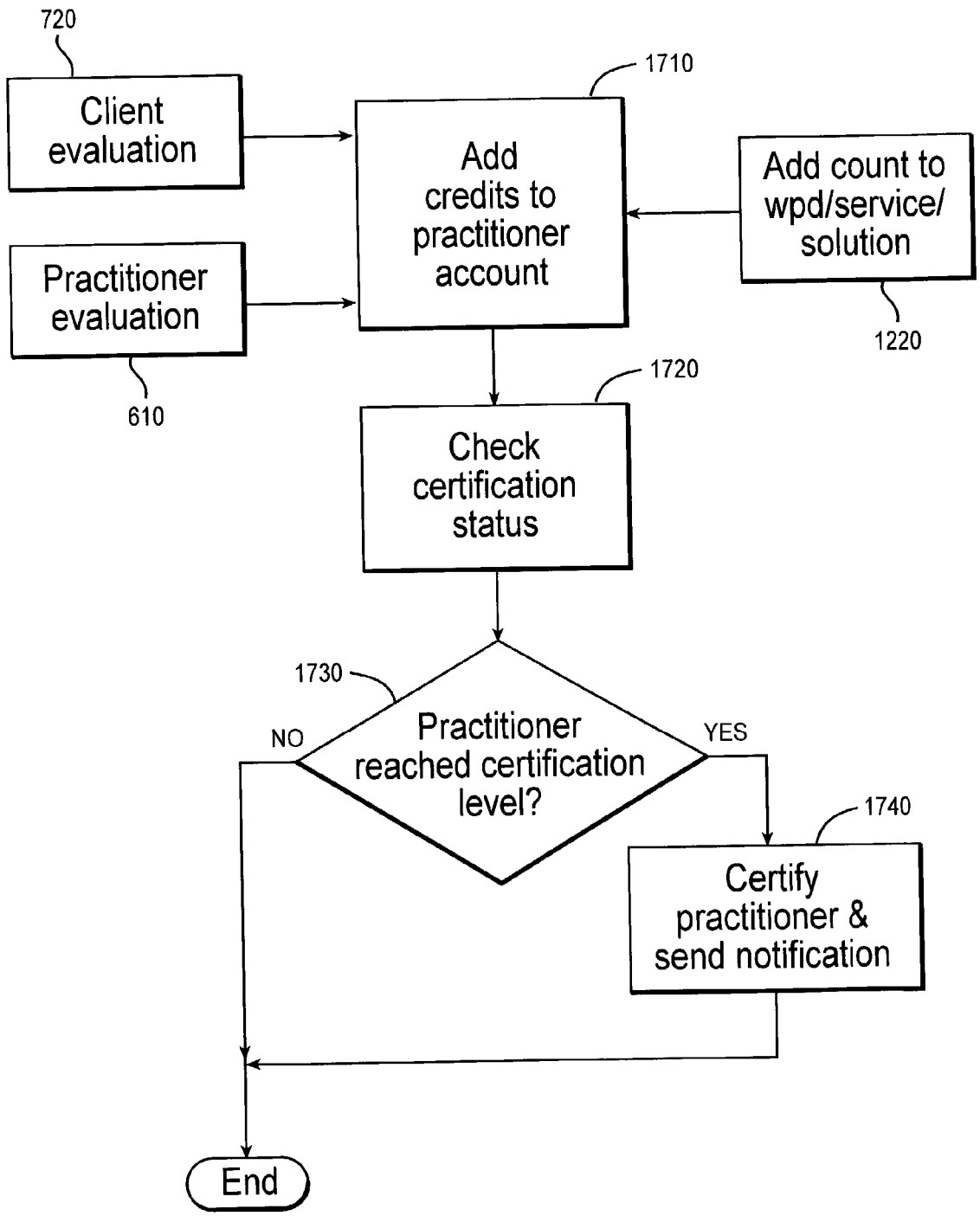
FIG. 17 is a flowchart providing a logical overview of the "Practitioner Certification" component of the system according to the preferred embodiment.

FIG. 17 is the flow chart of the method used by the system to do automatic practitioner certification. Certification is done to assure a high level of professional quality. Levels of certification could be 'trainee', 'certified', 'expert', etc . . . Each level of certification is defined by a certain number of credits, of which a certain minimum number has to come from client evaluations. In the preferred embodiment, the practitioner certification function is implemented as a computer program or a set of computer programs, activated automatically by events. The CS System proposes to execute a succession of functions, activated sequentially or activated independently.

The first step in the practitioner certification process is the addition of credits to practitioner accounts (1710). This takes place as a result of the events 'add count to workproduct, service and/or solution' (1720), 'client enters workproduct/service evaluation' (720) and 'practitioner enters evaluation' (610). The workproduct, service and solution always has one or more owners. These owners get credits whenever one of their products is counted.

In the 'client enters workproduct/service evaluation' (720) and the 'practitioner enters evaluation' (610) steps client and practitioners have the possibility to give extra credits to specific practitioners.

The amount of credits that are added to the credit account of a practitioner depends on the type of event. These points are multiplied by the 'engagement effect complexity indicator', to include the complexity of an engagement when giving credits to a practitioner. The system checks the certification status of a practitioner each time he receives credits (1720). The amount of credits is compared with the certification levels. When a certification level is reached (1730, yes), the certification status of the practitioner is updated in the practitioner database, and a notification is sent to the practitioner and his manager (1740). When the practitioner has not yet reached a certification level (1730, no), no more system action is required.

The invention claimed is:

1. A method of generating a solution to a business issue experienced by a current client, delivering the solution, and crediting a practitioner who is a participant in providing the solution, the current client comprising an organization of multiple people and having at an organizational level above the multiple people a particular management capability to implement solutions to business issues, the method comprising:

identifying the business issue experienced by the current client and entering the identified business issue into a consulting and services automation system;

assessing at the organizational level the particular management capability of the current client and entering the assessed particular management capability of the current client into the consulting and services automation system;

using the consulting and services automation system, determining, based on the identified and entered business issue experienced by the current client and the assessed and entered management capability of the current client, that there exists a previously-generated solution for a previous client that can be used to generate a solution to the identified business issue experienced by the current client;

using the consulting and services automation system, generating the solution for the current client using the previously-generated solution for the previous client;

entering an agreed engagement effect regarding the solution for the current client into the consulting and services automation system;

executing an automated engagement effect complexity indicator calculation regarding the solution for the current client on the consulting and services automation system to determine a complexity of the entered agreed engagement effect, wherein the calculation is based on:
a number of abilities which are part of the agreed engagement effect;
agreed ability maturity levels, at the organizational level, of the abilities to be reached by the solution to the identified business issue; and
an ability gap that has to be closed for each of these abilities;

storing the engagement effect complexity indicator and the solution for the current client in a database;

delivering the solution for the current client to the current client; and crediting a practitioner who participated in providing the solution for the current client based on the calculated complexity indicator.

2. The method of claim 1, wherein the solution generated previously for the previous client is adapted for the current client.

3. The method of claim 2 wherein the solution is stored for generating future solutions for future clients.

4. The method of claim 3 wherein the current client performs an evaluation of the solution while using the solution and the evaluation is stored along with the solution.

5. The method of claim 1, further comprising crediting, in the consulting and services automation system, an owner of the previously generated solution for the previous client for using the previously-generated solution for the previous client to generate a solution for the current client, the owner being a user who has generated the previously-generated solution for the previous client.

6. The method of claim 1, wherein assessing the particular management capability of the current client to implement solutions to business issues further comprises using a set of ability statements to determine a management ability maturity gap, the management ability maturity gap being the difference between a current management ability maturity level of the current client at the organizational level and a desired maturity level at the organizational level for the current client's business goals, the method further comprising:

executing an automated feasibility level calculation function on the consulting and services automation system, the automated feasibility level calculation function utilizing the determined management ability maturity gap to search a work product and solution database to identify solutions, work products, and services with identical management ability maturity gaps to the determined management ability maturity gap; and calculating a feasibility level based on the identified solutions, work products, and services with identical management ability maturity gaps to the determined management ability maturity gap, the feasibility level being a representation of a level of difficulty of the current client to close at the organizational level the determined management ability maturity gap within a certain period of time.

7. The method of claim 1, wherein assessing the particular management capability of the current client to implement solutions to business issues and entering the assessed particular management capability of the current client into the consulting and services automation system further comprise:

using the consulting and services automation system to provide reference parameters to a practitioner to assist in assessing at the organizational level the particular management capability of the current client, the reference parameters having been validated and entered into the consulting and services automation system by one or more core team members to facilitate searching of a work product and solution database to identify solutions, work products, and services.

8. A computer program product on a non-transitory computer readable medium including computer instructions, which when executed by a processor, generate a solution to a business issue experienced by a current client, deliver the solution, and credit a practitioner who is a participant in providing the solution, the current client comprising an organization of multiple people and having at an organizational level above the multiple people a particular management capability to implement solutions to business issues, the computer instructions comprising:

computer instructions for identifying the business issue experienced by the current client;
   computer instructions for assessing at the organizational level the particular management capability of the current client;
   computer instructions for determining, based on the identified issue experienced by the current client and the assessed management capability of the current client, that there exists a previously-generated solution for a previous client that can be used to generate a solution to the identified business issue experienced by the current client;
   computer instructions for generating the solution for the current client, using the previously-generated solution for the previous client responsive to determining that there exists a previously-generated solution for a previous client;
   computer instructions for entering an agreed engagement effect regarding the solution for the current client into the consulting and services automation system;
   computer instructions for executing an automated engagement effect complexity indicator calculation regarding the solution for the current client on the consulting and services automation system to determine a complexity of the entered agreed engagement effect, wherein the calculation is based on:
      a number of abilities which are part of the agreed engagement effect;
      agreed ability maturity levels, at the organizational level, of the abilities to be reached by the solution to the identified business issue; and
      an ability gap that has to be closed for each of these abilities;
   computer instructions for storing the engagement effect complexity indicator and the solution for the current client in a database;
   computer instructions for providing the current solution to the current client for implementation; and
   computer instructions for crediting a practitioner who participated in providing the solution for the current client based on the calculated complexity indicator.

9. The computer program product of claim 8 wherein the solution generated previously for the previous client is adapted for the current client.

10. The computer program product of claim 9 wherein the current client performs an evaluation of the solution while using the solution and the evaluation is stored along with the solution.

11. The computer program product of claim 8, further comprising:
   computer instructions for crediting an owner of the previously-generated solution for the previous client for using the previously-generated solution for the previous client to generate a solution for the current client, the owner being a user who has generated the previously generated solution for the previous client.

12. The computer program product of claim 8, wherein the computer instructions for assessing the particular management capability of the current client to implement solutions to business issues further comprise computer instructions for:
   using a set of ability statements to determine a management ability maturity gap, the management ability maturity gap being the difference between a current management ability maturity level of the current client at the organizational level and a desired maturity level at the organizational level for the current client's business goals;
   executing an automated feasibility level calculation function utilizing the determined management ability maturity gap to search a work product and solution database to identify solutions, work products, and services with identical management ability maturity gaps to the determined management ability maturity gap; and
   calculating a feasibility level based on the identified solutions, work products, and services with identical management ability maturity gaps to the determined management ability maturity gap, the feasibility level being a representation of a level of difficulty of the current client to close at the organizational level the determined management ability maturity gap within a certain period of time.

13. A computer system for generating a solution to a business issue experienced by a current client, delivering the solution, and crediting a practitioner who is a participant in providing the solution, the current client comprising an organization of multiple people and having at an organizational level above the multiple people a particular management capability to implement solutions to business issues, the computer system comprising:
   at least one storage device; and
   at least one computing device for processing computer instructions to:
      identify the business issue experienced by the current client,
      assess at the organizational level the particular management capability of the current client,
      determine, based on the identified issue experienced by the current client and the assessed management capability of the current client, that there exists a previously-generated solution for a previous client that can be used to generate a solution to the identified business issue experienced by the current client,
      generate the solution for the current client using the previously-generated solution for the previous client responsive to determining that there exists a previously-generated solution for the previous client,
      enter an agreed engagement effect regarding the solution for the current client into the consulting and services automation system;
      execute an automated engagement effect complexity indicator calculation regarding the solution for the current client on the consulting and services automation system to determine a complexity of the entered agreed engagement effect, wherein the calculation is based on:
         a number of abilities which are part of the agreed engagement effect;
         agreed ability maturity levels, at the organizational level, of the abilities to be reached by the solution to the identified business issue; and
         an ability gap that has to be closed for each of these abilities;
      store the engagement effect complexity indicator and the solution for the current client in a database;
      provide the solution to the current client for implementation, and credit a practitioner who participated in providing the solution for the current client based on the calculated complexity indicator.

14. The computer system of claim 13 wherein the solution generated previously for the previous client is adapted for the current client.

15. The computer system of claim 14 wherein the current client performs an evaluation of the solution while using the solution and the evaluation is stored along with the solution.

16. The computer system of claim 13, wherein the at least one computing device further processes the computer instructions to credit an owner of the previously-generated solution for the previous client for using the previously-generated solution for the previous client to generate a solution for the current client, the owner being a user who has generated the previously-generated solution for the previous client.

17. The computer system of claim 13, wherein the at least one computing device is further configured to process the computer instructions to:

use a set of ability statements to determine a management ability maturity gap the management ability maturity gap being the difference between a current management ability maturity level of the current client at the organizational level and a desired maturity level at the organizational level for the current client's business goals;

execute an automated feasibility level calculation function utilizing the determined management ability maturity gap to search a work product and solution database to identify solutions, work products, and services with identical management ability maturity gaps to the determined management ability maturity gap; and calculate a feasibility level based on the identified solutions, work products, and services with identical management ability maturity gaps to the determined management ability maturity gap, the feasibility level being a representation of a level of difficulty of the current client to close at the organizational level the determined management ability maturity gap within a certain period of time.

* * * * *